US012609942B2

(12) United States Patent
Sastry et al.

(10) Patent No.: US 12,609,942 B2
(45) Date of Patent: Apr. 21, 2026

(54) CONTINUED TIME SYNCHRONIZATION IN THE PRESENCE OF ATTACKS USING ATTACK-AWARE TWIN

(71) Applicant: Intel Corporation, Santa Clara, CA (US)

(72) Inventors: Manoj Sastry, Portland, OR (US); Christopher Gutierrez, Hillsboro, IN (US); Marcio Rogerio Juliato, Portland, OR (US); Shabbir Ahmed, Portland, OR (US); Vuk Lesi, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 238 days.

(21) Appl. No.: 18/240,822

(22) Filed: Aug. 31, 2023

(65) Prior Publication Data

US 2025/0080549 A1 Mar. 6, 2025

(51) Int. Cl.
H04L 9/40 (2022.01)
G06F 1/04 (2006.01)
G06F 1/14 (2006.01)

(52) U.S. Cl.
CPC ............ H04L 63/1416 (2013.01); G06F 1/04 (2013.01); G06F 1/14 (2013.01)

(58) Field of Classification Search
CPC ........... H04L 63/1416; G06F 1/04; G06F 1/14
See application file for complete search history.

(56) References Cited

U.S. PATENT DOCUMENTS

| | | | |
|---|---|---|---|
| 8,694,939 B1 | 4/2014 | Frost et al. | |
| 9,094,392 B1 | 7/2015 | Hwang | |
| 9,112,630 B1 * | 8/2015 | Mizrahi | H04J 3/0641 |
| 9,973,601 B2 | 5/2018 | Spada | |
| 11,327,525 B1 | 5/2022 | Salluzzo et al. | |
| 11,849,016 B1 | 12/2023 | Wang | |
| 2013/0227008 A1 * | 8/2013 | Yang | G06F 1/12 |
| | | | 709/204 |
| 2013/0227172 A1 | 8/2013 | Zheng et al. | |
| 2014/0157405 A1 | 6/2014 | Joll | |

(Continued)

FOREIGN PATENT DOCUMENTS

| | | |
|---|---|---|
| CN | 114301561 A | 4/2022 |
| WO | 2022088106 A1 | 5/2022 |

OTHER PUBLICATIONS

European Search Report for EP Application No. 24184561.9, dated Nov. 15, 2024, 9 pages.

*Primary Examiner* — Nam T Tran
(74) *Attorney, Agent, or Firm* — KDW FIRM PLLC

(57) ABSTRACT
Techniques for an attack-aware digital twin in a time sensitive network are described. A method includes receiving time information for a network by an attack-aware digital twin (AADT), the AADT to simulate operations of a clock manager for a node in the network based on models of the clock manager, generating model clock control information to adjust a clock to a network time for the network, the model clock control information to contain a malicious time sample introduced by a time desynchronization attack in the network, and removing the malicious time sample from the model clock control information to adjust the clock to the network time for the network. Other embodiments are described and claimed.

17 Claims, 25 Drawing Sheets

(56) References Cited

U.S. PATENT DOCUMENTS

| | | | | |
|---|---|---|---|---|
| 2015/0378389 | A1 | 12/2015 | Kulkarni | |
| 2017/0093677 | A1 | 3/2017 | Skerry | |
| 2020/0252424 | A1 | 8/2020 | Regev | |
| 2021/0181787 | A1* | 6/2021 | Chan | G06F 1/14 |
| 2021/0211431 | A1 | 7/2021 | Albero | |
| 2021/0211461 | A1* | 7/2021 | Beardsley | H04L 63/1425 |
| 2022/0224501 | A1* | 7/2022 | Lesi | H04L 69/28 |
| 2022/0303034 | A1* | 9/2022 | Lesi | H04L 41/145 |
| 2023/0229188 | A1 | 7/2023 | Shapira | |
| 2024/0143020 | A1* | 5/2024 | Lesi | G06F 1/12 |
| 2024/0356687 | A1* | 10/2024 | Speicher | H04J 3/0667 |

* cited by examiner

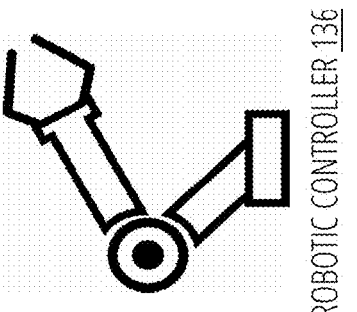
ROBOTIC CONTROLLER 136
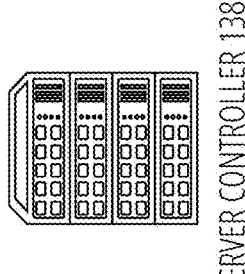
SERVER CONTROLLER 138
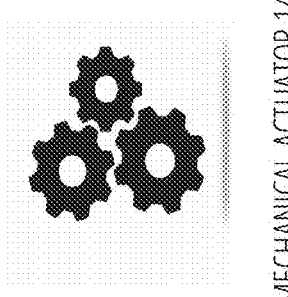
MECHANICAL ACTUATOR 148
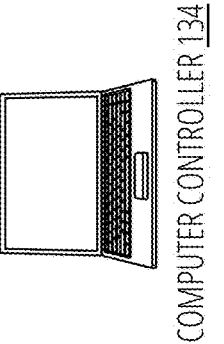
COMPUTER CONTROLLER 134
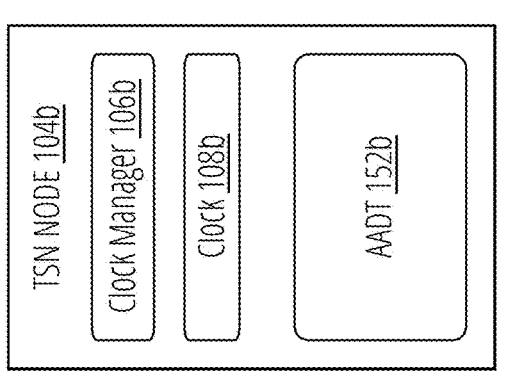
TSN NODE 104b
Clock Manager 106b
Clock 108b
AADT 152b
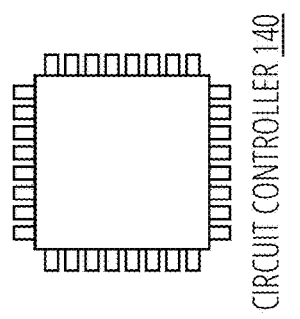
CIRCUIT CONTROLLER 140
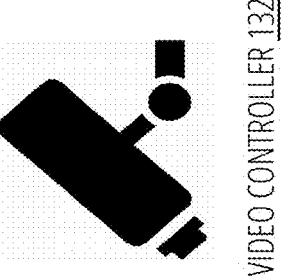
VIDEO CONTROLLER 132
ACTUATORS / CONTROLLERS 146
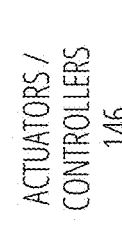
150
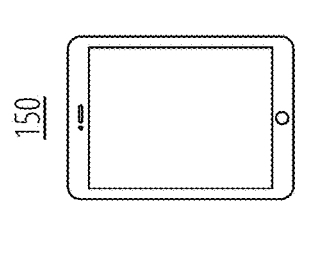
DEVICE CONTROLLER 142
FIG. 1C

RECEIVE TIME INFORMATION FOR A NETWORK BY AN ATTACK-AWARE DIGITAL TWIN (AADT), THE AADT TO SIMULATE OPERATIONS OF A CLOCK MANAGER FOR A NODE IN THE NETWORK BASED ON PHYSICS-AWARE MODELS 1202

GENERATE MODEL CLOCK CONTROL INFORMATION TO ADJUST A CLOCK TO A NETWORK TIME FOR THE NETWORK, THE MODEL CLOCK CONTROL INFORMATION TO CONTAIN A MALICIOUS TIME SAMPLE INTRODUCED BY A TIME DESYNCHRONIZATION ATTACK IN THE NETWORK 1204

REMOVE THE MALICIOUS TIME SAMPLE FROM THE MODEL CLOCK CONTROL INFORMATION 1206

GENERATING SANITIZED CLOCK CONTROL INFORMATION TO ADJUST THE CLOCK TO THE NETWORK TIME FOR THE NETWORK 1208

FIG. 12

1300

RECEIVE TIME INFORMATION FOR A NETWORK BY AN ATTACK-AWARE DIGITAL TWIN (AADT), THE AADT TO SIMULATE OPERATIONS OF A CLOCK MANAGER FOR A NODE IN THE NETWORK BASED ON PHYSICS-AWARE MODELS 1302

GENERATE MODEL CLOCK CONTROL INFORMATION TO ADJUST A CLOCK TO A NETWORK TIME FOR THE NETWORK, THE MODEL CLOCK CONTROL INFORMATION TO CONTAIN A MALICIOUS TIME SAMPLE INTRODUCED BY A TIME DESYNCHRONIZATION ATTACK IN THE NETWORK 1304

REMOVE THE MALICIOUS TIME SAMPLE FROM THE MODEL CLOCK CONTROL INFORMATION 1306

GENERATING SANITIZED CLOCK CONTROL INFORMATION TO ADJUST THE CLOCK TO THE NETWORK TIME FOR THE NETWORK 1308

RECEIVE THE TIME INFORMATION FOR THE NETWORK BY THE CLOCK MANAGER 1310

GENERATE CLOCK CONTROL INFORMATION TO ADJUST THE CLOCK TO A NETWORK TIME FOR THE NETWORK 1312

CONTROL ACCESS TO A HARDWARE CLOCK BY A CLOCK CONTROL GATE IN RESPONSE TO GATE CONTROL LOGIC 1314

DETERMINE THE NETWORK IS OPERATING UNDER ATTACK CONDITIONS WHEN AN ALERT MESSAGE IS RECEIVED FROM AN INTRUSION DETECTION SYSTEM (IDS) 1316

SEND A CONFIGURATION SIGNAL TO THE CLOCK CONTROL GATE TO CONFIGURE THE CLOCK CONTROL GATE TO PASS THE SANITIZED CLOCK CONTROL INFORMATION FROM THE AADT TO THE HARDWARE CLOCK TO ADJUST THE HARDWARE CLOCK TO THE NETWORK TIME FOR THE NETWORK 1318

FIG. 13

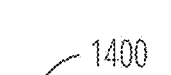

RECEIVE TIME INFORMATION FOR A NETWORK BY AN ATTACK-AWARE DIGITAL TWIN (AADT), THE AADT TO SIMULATE OPERATIONS OF A CLOCK MANAGER FOR A NODE IN THE NETWORK BASED ON PHYSICS-AWARE MODELS 1402

GENERATE MODEL CLOCK CONTROL INFORMATION TO ADJUST A CLOCK TO A NETWORK TIME FOR THE NETWORK, THE MODEL CLOCK CONTROL INFORMATION TO CONTAIN A MALICIOUS TIME SAMPLE INTRODUCED BY A TIME DESYNCHRONIZATION ATTACK IN THE NETWORK 1404

REMOVE THE MALICIOUS TIME SAMPLE FROM THE MODEL CLOCK CONTROL INFORMATION 1406

GENERATING SANITIZED CLOCK CONTROL INFORMATION TO ADJUST THE CLOCK TO THE NETWORK TIME FOR THE NETWORK 1408

RECEIVE THE TIME INFORMATION FOR THE NETWORK BY THE CLOCK MANAGER 1410

GENERATE CLOCK CONTROL INFORMATION TO ADJUST THE CLOCK TO A NETWORK TIME FOR THE NETWORK 1412

CONTROL ACCESS TO A HARDWARE CLOCK BY A CLOCK CONTROL GATE IN RESPONSE TO GATE CONTROL LOGIC 1414

DETERMINE THE NETWORK IS OPERATING UNDER BENIGN CONDITIONS 1416

SEND A CONFIGURATION SIGNAL TO THE CLOCK CONTROL GATE TO CONFIGURE THE CLOCK CONTROL GATE TO PASS THE CLOCK CONTROL INFORMATION FROM THE CLOCK MANAGER TO THE HARDWARE CLOCK TO ADJUST THE HARDWARE CLOCK TO THE NETWORK TIME FOR THE NETWORK 1418

COMPUTER EXECUTABLE INSTRUCTIONS 1604

COMPUTER EXECUTABLE
INSTRUCTIONS 1602

FIG. 16

CONTINUED TIME SYNCHRONIZATION IN THE PRESENCE OF ATTACKS USING ATTACK-AWARE TWIN

CROSS REFERENCE TO RELATED CASE

This application relates to previously filed U.S. patent application Ser. No. 17/974,113 filed Oct. 26, 2022, entitled "CLOCK MANAGER REDUNDANCY FOR TIME SYNCHRONIZED NETWORKS."

BACKGROUND

Many computing systems require real-time safety critical features. For example, many autonomous systems, industrial systems, etc., require such systems to have real-time safety-critical features. This often necessitates that timekeeping performance within the system has higher levels of security relative to other aspects of the system. For example, factories employ synchronized robots to accomplish coordinated tasks, often in the presence of human beings. In another example, robots utilize coordination to perform surgeries on humans. As yet another example, self-driving vehicles require synchronization of networked sensing elements to build a precise perception of the environment around the vehicle, including other vehicles, objects, hazards, and persons. Tools relied on to achieve the necessary time performance, synchronization, and bounded latency communication for such time sensitive systems to perform as needed is often referred to as time-sensitive networking (TSN).

In general, TSN defines a set of standards (and amendments) with the aim to enable time synchronization and deterministic data delivery in converged networks where time-critical (TC) traffic coexists with other types of traffic. Thus, there is a need to provide security for TSN devices to mitigate the risks associated with disruption in TSN operation from attacks on the timing of the network.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1C illustrates an aspect of a TSN 102 for actuators in accordance with one embodiment.

FIG. 12 illustrates a logic flow 1200 in accordance with one embodiment.

FIG. 13 illustrates a logic flow 1300 in accordance with one embodiment.

FIG. 14 illustrates a logic flow 1400 in accordance with one embodiment.

FIG. 16 illustrates an aspect of a computer-readable medium 1600 in accordance with one embodiment.

DETAILED DESCRIPTION

Figure 1A:
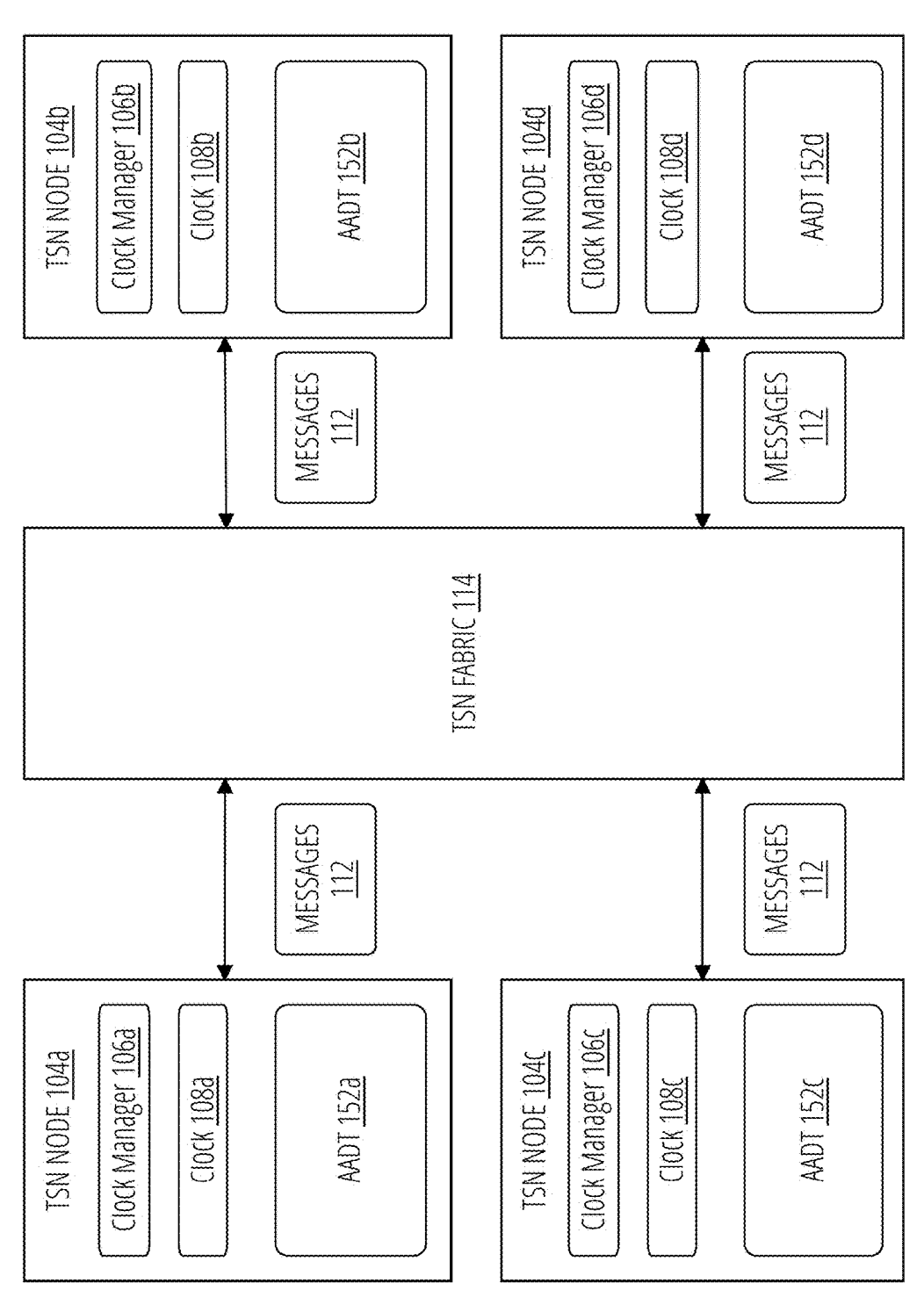
FIG. 1A illustrates an aspect of a time sensitive network (TSN) 102 in accordance with one embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

The present disclosure is generally directed to time management and recovery techniques for systems operating on strict time requirements, such as systems based on time sensitive networks (TSNs). As noted, TSN defines a set of standards (and amendments) with the aim to enable time synchronization and deterministic data delivery in converged networks where time sensitive traffic coexists with other types of traffic. Various standards have been developed to address time-synchronized or time-sensitive communications. By way of example and not limitation, some standards for enabling time-synchronized communications include those promulgated by the Institute of Electrical and Electronics Engineers (IEEE) and/or the International Electrotechnical Commission (IEC). For example, IEEE 1588, IEEE 802.1AS, IEEE 802.1Qbv and IEC/IEEE 60802 provide systems and methods for synchronizing device clocks. In one example, IEEE 1588 defines a precision time protocol (PTP) for time synchronization across a network. In another example, IEEE 802.1AS defines a time-sensitive networking protocol referred to as a generic PTP (gPTP) for time synchronization across a network, where time sensitive devices (e.g., clock followers) synchronize to a leader clock (e.g., clock leader). In yet another example, IEEE 802.1Qbv defines time-sensitive networking for deterministic latency through traffic scheduling. In still another example, IEC/ IEEE 60802 defines time-sensitive networking profiles for industrial automation. Other examples include a network time protocol (NTP) which is a networking protocol for clock synchronization between computer systems over packet-switched, variable-latency data networks, network time security (NTS) which is a secure version of NTP, and other time-synchronized network protocols. Embodiments are not limited to these examples.

Time synchronization in a TSN requires tight software-hardware interplay. A device (or node) in a TSN may implement a clock manager as a software component and a hardware clock as a hardware component. The clock manager adjusts timing for the hardware clock to ensure synchronization with a common network time for the TSN. In one embodiment, for example, a precision time protocol (PTP) hardware clock (PHC) is periodically adjusted by a PTP for Linux (PTP4L) software module to account for time offset between a clock leader and a clock follower in PTP-synchronized nodes. When a software component receives incorrect time information, such as a time offset bias within messages carrying time synchronization information, the software can misconfigure or mis-control hardware for the PHC, thereby leading to incorrect timekeeping. For instance, attackers located external to a TSN-capable platform along a network path can tamper with messages carrying time information to synchronize the hardware clock. Examples include malicious switches and/or relays tampering with time-related messages, or external attackers injecting messages into the network, which ends up impacting a time of the nodes downstream. Consequently, system and applications depending on TSN capabilities will consume incorrect time. Accordingly, early detection of a corrupted messages and/or software components for a TSN node is critical within a TSN.

One conventional solution to address this problem is to implement one or more intrusion detection systems (IDSs) to monitor devices within a TSN to identify any abnormal behavior. An IDS implements software, firmware or hardware to support one or more specialized security functions, such as detecting malicious behavior caused by an attacker. The IDS may be implemented on a TSN node or separate from a TSN node. The IDS receives as input messages containing time information for synchronizing a clock of a TSN node with a network time for the TSN. The IDS analyzes the messages to detect anomalies, such as slight modifications to the time information to cause a TSN node to update an internal clock with a wrong network time. Incorrect time synchronization can cause disruptions in time sensitive applications executing on the TSN node, such as causing collisions between cooperative robotic arms or delaying braking in an autonomous vehicle. When the IDS detects abnormalities in messages carrying time information, the IDS generates an alert and takes action to isolate any affected TSN applications and/or TSN nodes from a compromised TSN node.

While deploying multiple IDSs throughout a TSN improves security for the TSN, a TSN may be compromised before an IDS can accurately detect an attack. Even when an IDS does detect an attack in a timely manner, a TSN node may not have the ability to compensate for the attack before it is critically compromised. This results in a TSN node failing or becoming quarantined from the TSN, thereby causing any TSN applications reliant on timing from the TSN node to fail as well. The failure of a TSN node and/or TSN application may cause damage to equipment (e.g., robotic arms), vehicles (e.g., self-driving cars), or in some cases a loss of human life. Current solutions lack an efficient method to recover from attacks in time synchronization and traffic scheduling in modern TSNs.

To solve these and other problems, embodiments implement a "digital twin" of a clock manager for a TSN node. In general, a digital twin is a virtual representation of a physical object, process, or system. It is a digital counterpart that replicates the behavior, characteristics, and functionality of its real-world counterpart. Various embodiments implement the concept of a digital twin for a clock manager of a TSN node that mirrors the clock management operations of the clock manager. The digital twin is designed to take over clock manager operations for the TSN node in the event the TSN node or another node in the TSN experiences an attack, such as a time desynchronization attack, among others. A fundamental operation of a TSN is synchronizing time for local clocks in each of the TSN nodes to a common network time used by the entire TSN. This is accomplished through the periodic transport of time information in TSN messages between nodes. A time desynchronization attack attempts to make changes in timing maintained by the local clocks in the TSN nodes, such as through changing of the time information, thereby causing the TSN nodes to desynchronize from the common network time of the TSN.

In one embodiment, for example, a TSN node implements a clock manager (e.g., a PTP4L) to control clock hardware (e.g., a PHC). In addition, the TSN node also implements an "attack-aware digital twin," referred to herein as an AADT, that is designed to mirror operations for the clock manager. In one embodiment, an AADT is a software component for a digital twin of a clock manager of a TSN node. The AADT is specifically designed to model, simulate or replicate clock management operations for the clock manager. In one embodiment, the AADT is based on a heterogenous and redundant analytical physics-aware model of the clock manager. These techniques are physics-aware since a standard Linux implementation of a PTP4L clock manager is based on a proportional-integral (PI) controller. These techniques are analytical (i.e., equation based) in order to cover advancements in clock manager technology, such as the design and implementation of advanced PTP servos by the Time Appliances Project. The use of an analytical physics-aware model for the AADT results in execution of a lightweight, verifiable model at runtime to precisely mirror clock management operations for the TSN node. This consumes less compute cycles and memory resources, while enabling earlier recovery of compromised clock platforms in a TSN node when under attack.

During operations of the TSN node, the clock manager receives time information from TSN messages, and it calculates clock control information (e.g., frequency or phase adjustments) to adjust clock hardware so that the clock remains synchronized with a network time for the TSN. In addition, the AADT receives the same time information as the clock manager, via hardware or software taps, and it calculates model clock control information to adjust clock hardware. Since the clock control information and the model clock control information use the same inputs, and the AADT uses a physics-aware model that precisely replicates operations for the clock manager, the clock control information and the model clock control information should remain relatively close to each other under benign conditions.

When the TSN is under attack, however, the model clock control information may include one or more malicious time samples introduced by the attack on the transported time information. A time sample is a discrete measurement or data point taken at a specific moment of time within a continuous timeframe. A malicious time sample is a time sample that has been biased or modified to a different time value by an attack. For instance, a TSN message might carry time information with a time sample of 1 millisecond (ms) and an attack may add or subtract 500 nanoseconds (ns) to the time sample. This may occur every synchronization cycle, with the cumulative effects causing a network time in a TSN to drift over each synchronization cycle. In one embodiment, the AADT identifies and removes malicious time samples from the model clock control information to form sanitized clock control information. In one embodiment, for example, the phrase "sanitized clock control information" refers to a modified version of the model clock control information where the malicious time samples have been removed or excised from the model clock control information.

A clock control gate receives both the clock control information from the clock manager and the sanitized clock control information from the AADT. The AADT implements gate control logic for controlling gating operations of the clock control gate, and it determines whether to pass the clock control information or the sanitized clock control information to the clock hardware based on a particular configuration for the AADT.

In one embodiment, for example, the AADT controls gating operations based on explicit evidence of an attack. For example, an IDS may monitor operations for a TSN node, and it sends a security alert to the AADT that an attack is occurring within the TSN node or other TSN nodes in the TSN. The AADT then sends one or more control directives, such as configuration signals, to the clock control gate to configure it to block the clock control information from the clock manager and pass the sanitized clock control information from the AADT. In the absence of explicit evidence of an attack, such as in normal operating conditions for the TSN node, the AADT sends one or more control directives, such as configuration signals, to the clock control gate to configure it to pass the clock control information from the clock manager and block the sanitized clock control information from the AADT.

In one embodiment, for example, the AADT controls gating operations based on implicit evidence of an attack. For example, the clock control gate includes a comparator to continuously compare the clock control information from the clock manager with the sanitized clock control information from the AADT to find a difference value (e.g., a residual signal). When the difference value is above (or below) a certain defined threshold, thereby indicating influence of an attack, the clock control gate blocks the clock control information and passes the sanitized clock control information to the clock hardware. When the difference value is below (or above) a certain defined threshold, thereby indicating normal TSN operations, the clock control gate passes the clock control information and blocks the sanitized clock control information to the clock hardware. This process occurs on a continuous basis, and once an attack is detected, the AADT can smoothly and accurately take over clock manager operations for the TSN node until the attack is mitigated. In this manner, the TSN node can continue normal operations supporting TSN applications within the TSN without disruption or failure, even in the presence of an ongoing attack.

FIG. 1A depicts a time sensitive network (TSN) 102 implemented according to a TSN standard (e.g., IEEE 1588, IEEE 802.1AS, IEEE 802.1Qbv, IEEE 802.15.4, or the like). As depicted, TSN 102 includes various TSN nodes 104, such as TSN nodes 104*a-d*. The TSN nodes 104 may be implemented as different types of nodes for a TSN, such as an origination node, relay nodes, switch nodes or end node. The TSN nodes 104*a-d* are communicatively coupled via a TSN fabric 114. The TSN fabric 114 can connect the TSN nodes 104*a-d* using various types of network topology (e.g., mesh, star, etc.) and various types of communications channels (e.g., wired, wireless, fiber optic, buses, etc.). It is noted that the number of nodes in the TSN 102 is selected for purposes of clarity and not limitation. In practice, the TSN 102 can include any number and combination of nodes (e.g., origination nodes, switches, relay nodes, end devices, etc.).

The TSN nodes 104 can communicate with each other via the TSN fabric 114. For instance, the TSN nodes 104 can send messages 112 to each other over one or more communication channels provided by the TSN fabric 114. The messages 112 can include control information and payload information. One type of control information may include time information. The time information may comprise synchronization messages, time update messages or time follow-up messages (among other time protocol messages) for a time protocol used by the TSN 102.

Each TSN node 104 in the TSN 102 includes various hardware, software and/or firmware components. As depicted in FIG. 1A, a TSN 104 includes a clock manager 106, a clock 108, and a AADT 152. For instance, the TSN node 104*a* includes a clock manager 106*a*, a clock 108*a*, and an AADT 152*a*. The TSN node 104*b* includes a clock manager 106*b*, a clock 108*b*, and an AADT 152*b*. The TSN nodes 104*c*, 104*d* are similarly configured. It may be appreciated that these are just a few components for a TSN 104, and the TSN 104 can include other standard components for an electronic device, such as network interfaces, radio transceivers, input/output (I/O) components, memory units, processing circuits, controllers, sensors, actuators, mechanical parts, application software, operating system software, TSN-enabled platforms, and so forth.

In various embodiments, the clock manager 106 is implemented as a software component, and the clock 108 is implemented as a hardware component (e.g., "hardware clock" or "clock circuitry"). The AADT 152 can be implemented as a software component, a hardware component, or a combination of both software and hardware components.

The clock manager 106 and the AADT 152 should be implemented in separate execution environments isolated from each other. For instance, the clock manager 106 and the clock manager 152 can be implemented by different processing circuitries, processors, logic circuits, chips, dies, systems on a chip (SoC), apparatus, devices, systems, and so forth. In one embodiment, the AADT 152 is implemented in a hardened execution environment such as secure TPM or TCB. In this manner, a security attack on the clock manager 106 will not affect the AADT 152. Embodiments are not limited in this context.

The clock manager 106 generally manages a time (e.g., clock signals) generated by the clock 108. A key component in clock synchronization mechanisms is the clock manager software. In a time sensitive network such as the TSN 102, this component tightly interacts with network hardware (e.g., Ethernet/Wi-Fi) to obtain Precision Time Protocol (PTP) message timestamps, as well as with PTP clock hardware to implement suitable phase/frequency corrections in order to synchronize with a clock leader. The clock manager 106 typically implements a "clock servo." A clock servo is a control algorithm that periodically takes as input some measurement (or estimate) of clock offset to a reference clock, and computes as output either time (e.g., phase) or frequency adjustment to compensate for the given offset.

The clock 108 is generally a hardware clock that implements clock circuitry to generate signals for digital electronics implemented by the TSN node 104. In electronics and especially synchronous digital circuits, a clock signal oscillates between a high and a low state and is used to coordinate actions of the digital circuits. A clock signal is produced by a clock generator. Although more complex arrangements are used, the most common clock signal is in the form of a square wave with a 50% duty cycle, usually with a fixed, constant frequency. Circuits using the clock signal for synchronization may become active at either the rising edge, falling edge, or, in the case of double data rate, both in the rising and in the falling edges of the clock cycle. The clock 108 generates clock signals under control of the clock manager 106. The clock 108 can be implemented using any suitable hardware having a timing accuracy required by a given device or network. In the TSN 102, the clock 108 can be implemented as a PHC, although other hardware clocks can be implemented as well. Embodiments are not limited in this context.

In normal operation, a network interface (not shown) for a TSN node 104 can receive messages 112 that include time information representative of a network time for the TSN 102. The clock manager 106 can receive the time information from the network interface, analyze the time information, and determine whether time adjustments are needed for the clock 108. When time adjustments are needed, the clock manager 106 generates control information and sends the control information to the clock 108. The clock 108 receives the clock manager control information, and adjusts a parameter for the clock 108, such as a phase or frequency for the clock signals generated by the clock 108.

The AADT 152 is a digital twin of the clock manager 106. It generally provides an alternate time source that remains on ready stand-by in case the clock manager 106 is subject to a security attack and compromised. In one embodiment, the AADT 152 can implement the same or similar clock management software as used by the clock manager 106. For instance, when a TSN node 104 implements the clock manager 106 as a PTP4L, the clock servo is a proportional integral (PI) controller. In this case, the AADT 152 may implement similar functions to PTP4L using physics-aware models, which are analytical equation based representations of the PTP4L. In general, the AADT 152 should maintain a same operational state as the clock manager 106 in order to be ready to take over clock timing operations for a TSN node. In one embodiment, for example, the AADT 152 can directly consume the same time measurements as the clock manager 106 during normal operations. This implementation means that access to the time information must be outside a reach for an attacker, hence, the clock circuitry would be considered secure itself. This could be implemented via direct taps into the communications bus or channels between the network interface and the clock manager 106. The AADT 152 is described in more detail with reference to FIG. 6.

Figure 1B:
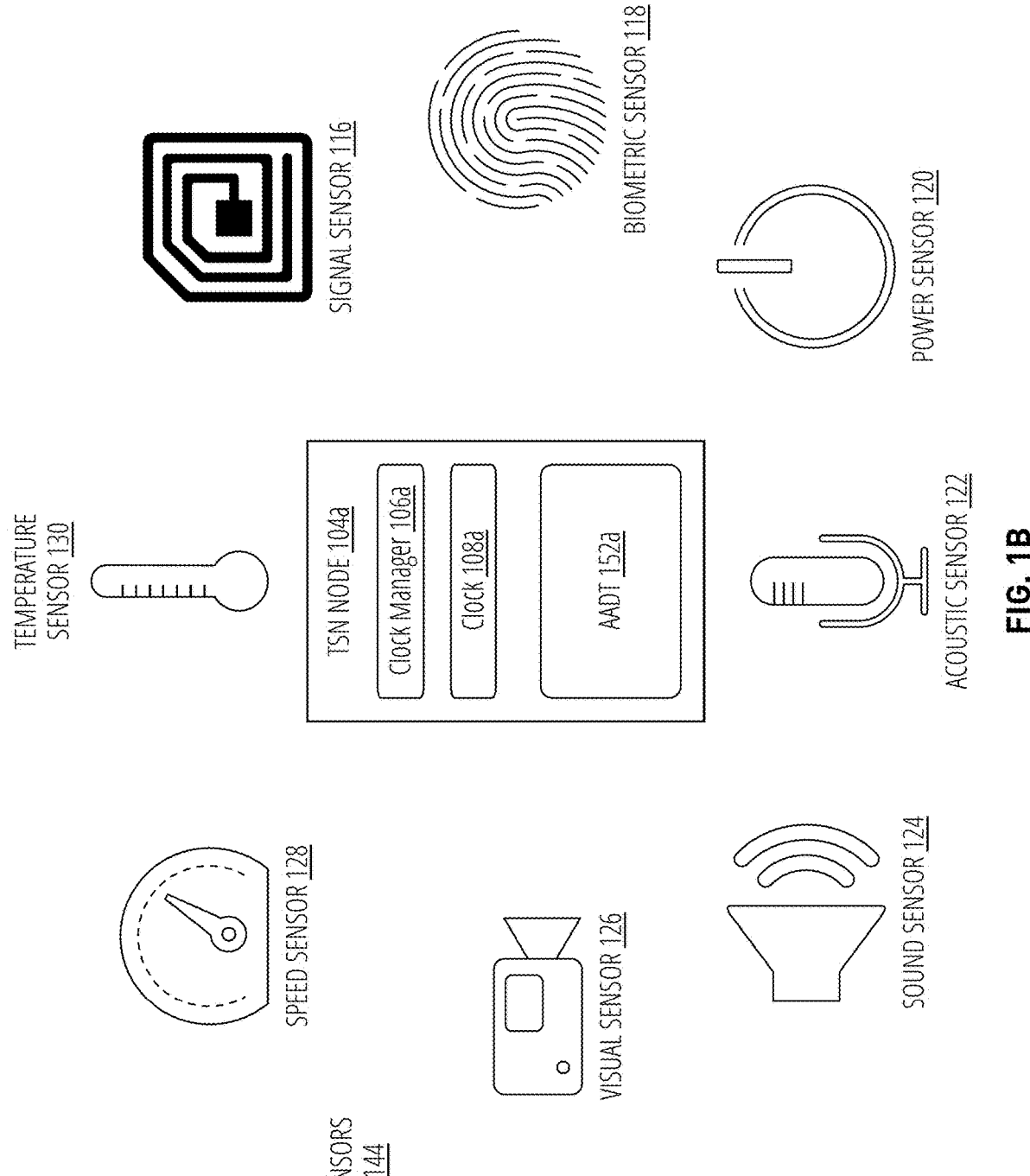
FIG. 1B illustrates an aspect of a TSN 102 for sensors in accordance with one embodiment.

FIG. 1B illustrates an example of a TSN node 104a of the TSN 102 designed to control one or more sensors 144. As depicted in FIG. 1B, the TSN node 104 manages various types of sensors 144, such as a signal sensor 116, a biometric sensor 118, a power sensor 120, an acoustic sensor 122, a sound sensor 124, a visual sensor 126, a speed sensor 128, a temperature sensor 130, and so forth. The TSN node 104a may be suitable for implementing a physics-based model for the AADT 152. A physics-based approach as proposed herein utilizes state prediction based on physical models of system dynamics. Unlike conventional information-based security measures, the physics-based model may utilize physical properties of a system, along with controller state estimation, to enable computationally-inexpensive analytical redundancy. For example, a mathematical model-based replica of the system is simultaneously executed to detect attacks.

FIG. 1C illustrates an example of a TSN node 104b of the TSN 102 designed to control one or more actuators and/or host controllers 146. As depicted in FIG. 1C, the TSN node 104b manages various types of actuators/controllers 146, such as a robotic controller 136, a server controller 138, a mechanical actuator 148, a circuit controller 140, a device controller 142, a video controller 132, a computer controller 134, and so forth. As with FIG. 1B, the TSN node 104b shown in FIG. 1C may be suitable for implementing a physics-based model for the AADT 152, as discussed in more detail herein.

In time sensitive networks, such as the TSN 102 depicted in FIGS. 1A-1C, it becomes important for all the TSN nodes 104 to synchronize to a common or shared network time for the TSN 102. For instance, the TSN nodes 104 may operate in accordance with IEEE 802.1AS which implements a hierarchical network to synchronize one or more clock followers (CFs) to a clock leader (CL) through relays or switch nodes. Synchronization is performed through communication of time messages, such as the messages 112. The time messages may comprise, for example, time synchronization messages, time update messages and/or time follow-up messages for a PTP.

In some cases, an attacker may simply attempt to disrupt timing of a single TSN node 104 handling critical functions, such as disrupting one or both of the TSN node 104a managing the sensors 144 and/or the TSN node 104b managing the actuators/controllers 146. Rather than attempting to disrupt timing for the entire TSN 102, the attacker may attempt to attack timing of a single TSN node 104 to disrupt key operations for the TSN node 104, such as an electronic control unit (ECU) to control speed sensing for a vehicle or a controller for a robotic arm in a factory.

In other cases, an attacker may attempt to disrupt timing across the entire TSN 102. To attack or disrupt the TSN 102, an attacker may attempt a timing attack or desynchronization attack to compromise timing for one or more of the TSN nodes 104 in the TSN 102. Assume the TSN node 104c operates as a clock leader (CL) in the TSN 102, and the TSN node 104d operates as a clock follower (CF) in the TSN 102. If an attacker located on a network device (e.g., switch) modifies a critical attribute on a specific port, then all downstream nodes from that network device will suffer a desynchronization event. In this example, if the attacker successfully compromises the TSN node 104c, then the TSN node 104d is vulnerable to a timing attack in the form of receiving messages 112 from the TSN node 104c with erroneous time information. Therefore, it becomes important to detect and localize an attack as quickly as possible. Furthermore, upon detection, it becomes important for the TSN 102 to quickly isolate the compromised network device and thereby prevent the desynchronization attack from spreading to other downstream nodes.

In all cases, a time sensitive network such as the TSN 102 is vulnerable to a timing attack or a desynchronization attack. If a single network node is compromised, it may cause a cascade failure across the entire TSN 102. An example of such an attack is further described with reference to FIGS. 2A, 2B, 3A and 3B.

Figures 2A, 2B:
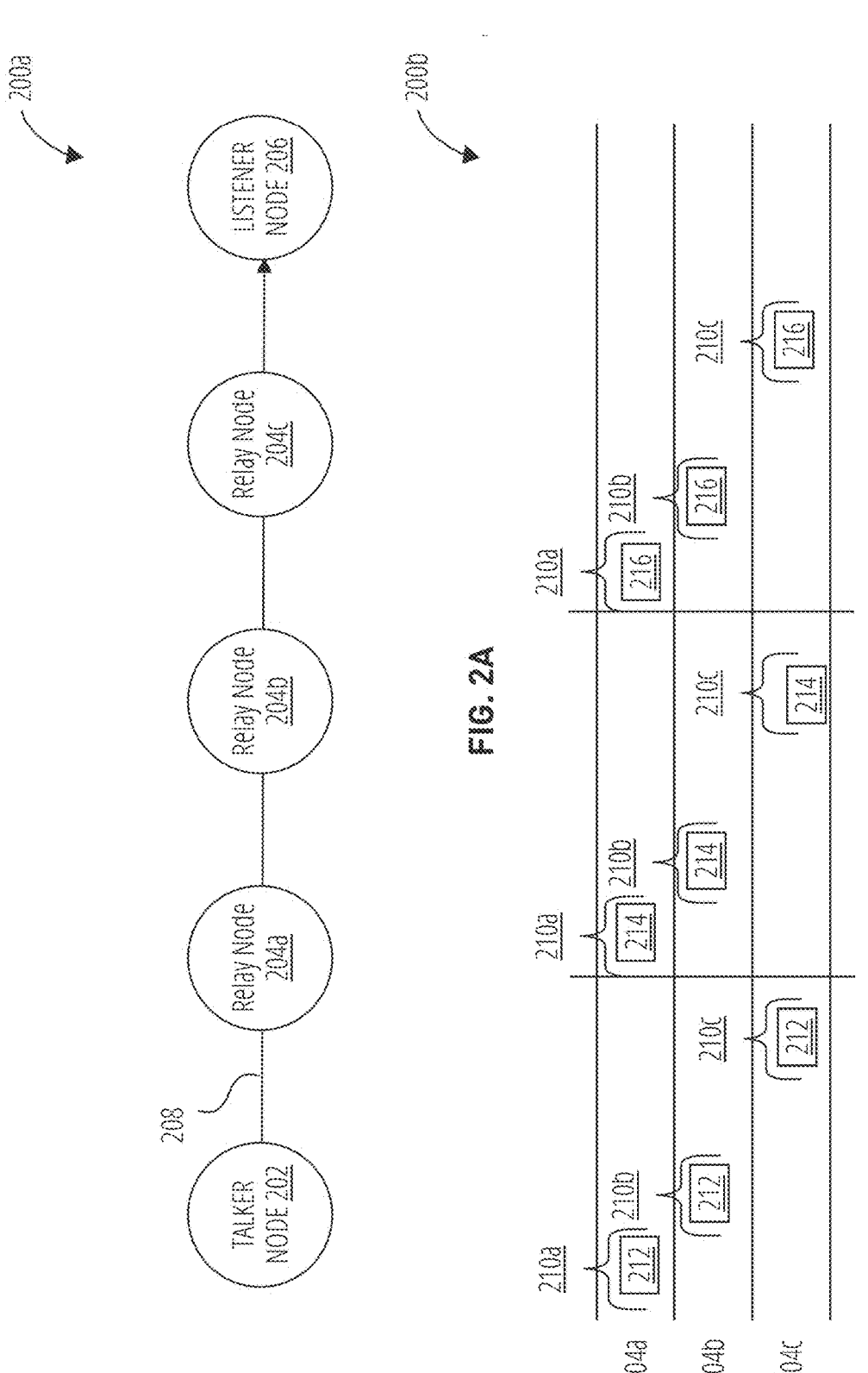
FIG. 2A illustrates an aspect of a TSN 200a in accordance with one embodiment.
FIG. 2B illustrates an aspect of a timing diagram 200b in accordance with one embodiment.

FIG. 2A depicts a TSN 200a implemented according to a TSN standard (e.g., IEEE 1588, IEEE 802.1AS, IEEE 802.1Qbv, or the like). As depicted, the TSN 200a includes talker node 202, relay nodes 204a, 204b, and 204c, and listener node 206, all communicatively coupled via communication channel 208. It is noted that the number of nodes in the TSN 200a is selected for purposes of clarity and not limitation. In practice, the TSN 200a can include any number and combination of nodes (e.g., origination nodes, talker nodes, listener nodes, switches, relay nodes, end devices, etc.). Nodes in the TSN 200a (e.g., talker node 202, listener node 206, relay node 104a, relay node 104b, and relay node 104c, etc.) are provided in a GCL table, which specifies timing for windows in which the nodes can transmit packets on communication channel 208. It is also noted that the terms "switch node" and "relay node" are used interchangeably. For instance, the IEEE 802.AS defines protocol-aware switches as relays.

Relay nodes 204a, 204b, and 204c are time-aware switching nodes and can be any number of devices in a network arranged to communicate information. A talker node 202 sends or originates information and a listener node 206 receives or consumes information. Examples of a talker node 202 or a listener node 206 include devices such as electronic control units in an autonomous vehicle, an industrial system, a medical system, or the like. Additionally, communication channel 208 can be any of a variety of communication channels, including wired or wireless communication channels. In some implementations, all devices in the TSN 200a will receive GCL tables. However, in some implementations, only talker nodes 202 and switching nodes (e.g., relay node 204a, etc.) receive GCL tables while destination devices (e.g., listener node 206) do not receive a GCL table.

FIG. 2B depicts a timing diagram 200b depicting communication windows (e.g., Qbv windows, or the like) for switches of TSN 200a based on GCL tables. Typically, GCL tables are generated in a network controller (not shown) and are designed to prioritize time critical (TC) traffic and prevent lower priority traffic from accessing communication channel 208, thus guaranteeing the timely delivery of TC packets within pre-configured time windows. In particular, timing diagram 200b depicts Qbv windows 210a, 210b, and 210c in which packets 212, 214, and 216 are transmitted. It is noted that the communication windows referred to herein are referred to as Qbv windows or protected windows for clarity. However, other standard or techniques for forming protected communication windows to facilitate time synchronization can be used besides Qbv windows. Examples are not limited in this context.

To facilitate transmission of packets (e.g., packet 212, etc.) during protected windows (e.g., Qbv window 210a, etc.), nodes in the TSN 200a are time synchronized and scheduled to transmit TC packets (e.g., packet 212, etc.) using non overlapping protected windows (e.g., Qbv window 210a, etc.). It is to be appreciated that providing latency bounded communication (e.g., as depicted in timing diagram 200b) requires tight synchronization of time between nodes in TSN 200a. With such dependency on time synchronization, reliable TSN operation can be disrupted by attacking the timing of the network, sometimes referred to as a desynchronization attack or event.

Figures 3A, 3B:
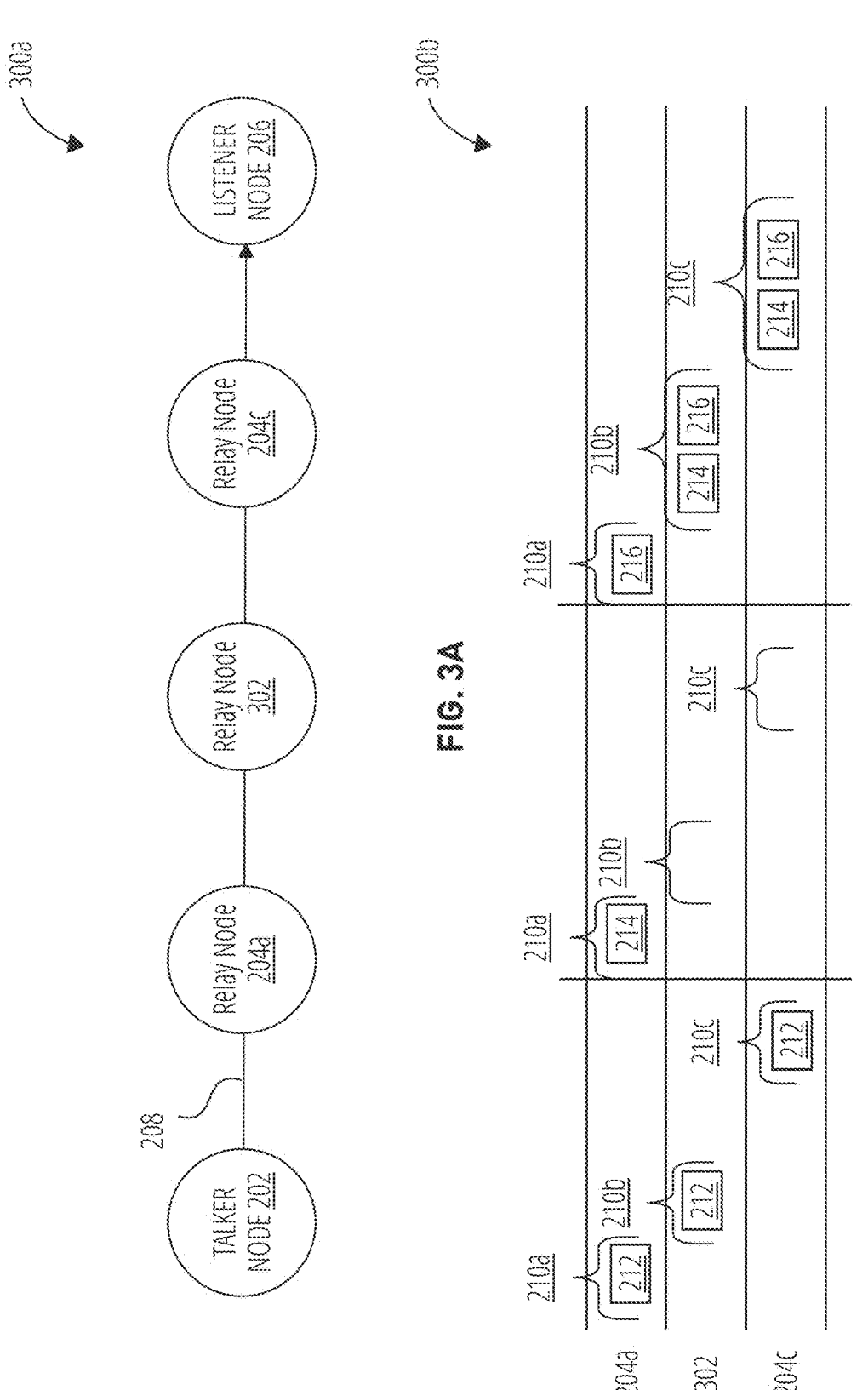
FIG. 3A illustrates an aspect of a TSN 300a in accordance with one embodiment.
FIG. 3B illustrates an aspect of a timing diagram 300b in accordance with one embodiment.

FIG. 3A depicts a TSN 300a, which is like TSN 200a except that the relay node 302 is depicted as compromised. In particular, the clock (not shown) of relay node 302 can be attacked and compromised, thereby causing the Qbv window 210b associated with relay node 302 to be misaligned with respect to, and even overlap with, the protected windows of the other switch nodes in the data stream path (e.g., along communication channel 208).

Figure 4:
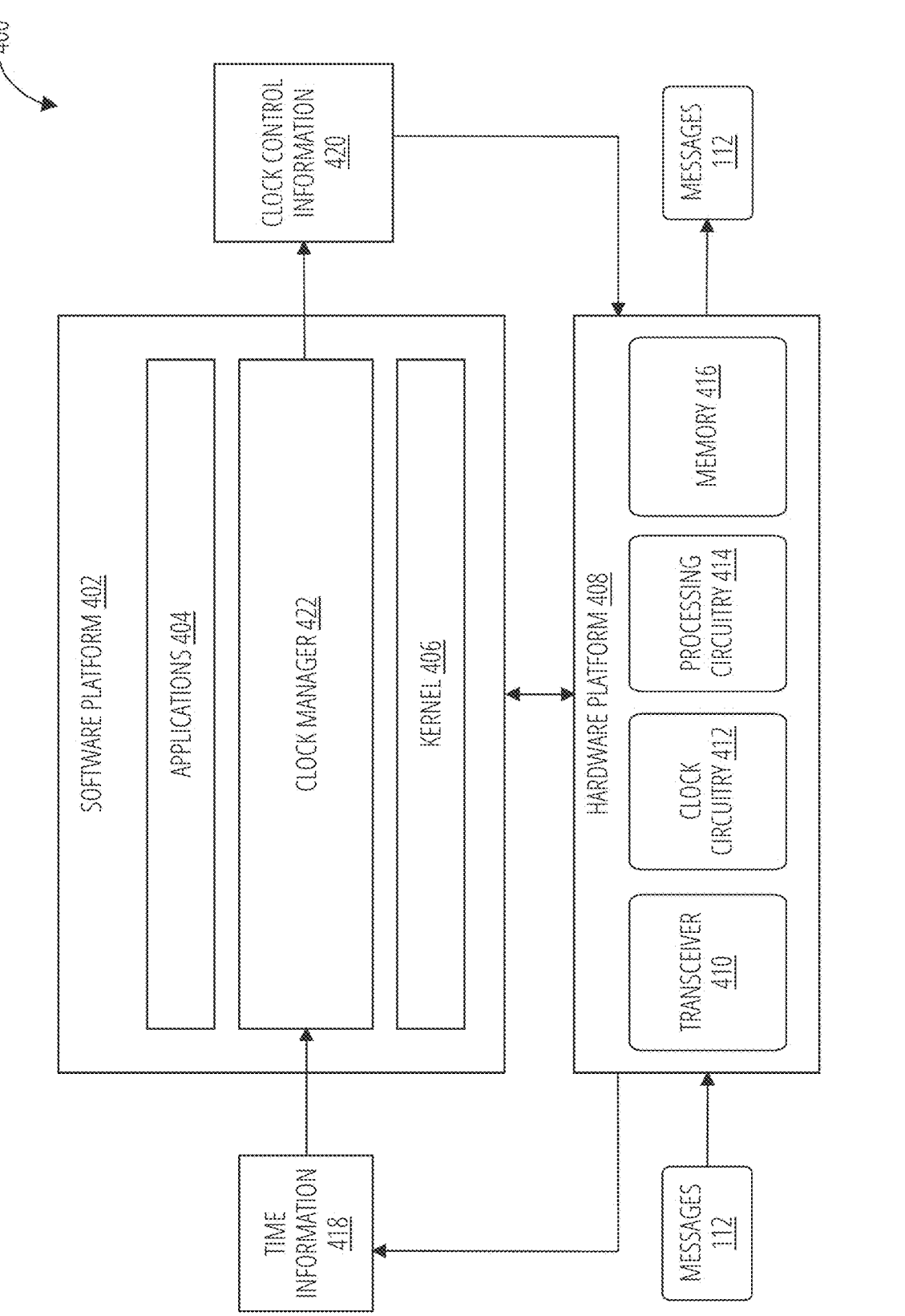
FIG. 4 illustrates an aspect of a TSN node 104 in accordance with one embodiment.

FIG. 3B depicts timing diagram 300b illustrating Qbv window 210b misaligned with Qbv window 210a and Qbv window 210c and overlapping with Qbv window 210a. As such, packets (e.g., packet 214 in the figure) arrive too late with respect to the attacked switch protected window (e.g., Qbv window 210b) causing them to be buffered and sent in the next protected window. As a result of the delay in transmitting packet 214, relay node 302 breaks the latency bound of the stream that it is serving and can result in errors or comprise the safety of the system in which the nodes are operating FIG. 4 illustrates an apparatus 400. The apparatus 400 is a more detailed view of part of a TSN node 104 that implements one or more TSN protocols or standards. The TSN node 104 may be implemented as any network devices suitable for operation within a TSN, such as TSN 102, 200a, 300a, and so forth. The TSN node 104 may be implemented as part of a vehicle, robot, industrial machine or any other devices suitable for a TSN. The TSN node 104 may be implemented as an origination node 202, relay nodes 204a-204c, relay node 302 and/or end node 206. The TSN node 104 may be implemented as either a clock leader (CL) or a clock follower (CF) in a TSN. The TSN node 104 may include interfaces to communicate information with other TSN nodes 104 in the TSN 102, such as messages 112, for example.

The TSN node 104 may operate in accordance with a timing protocol, such as a precision time protocol (PTP) for IEEE 1588, IEEE 802.1AS, IEEE 802.15.4, and so forth. For instance, the TSN node 104 may operate in accordance with IEEE 802.1AS which implements a hierarchical network to synchronize clock followers (CFs) to a clock leader (CL) through relays or switch nodes. Synchronization is performed through communication of time messages, such as the messages 112. The time messages may comprise, for example, time synchronization messages, time update messages or time follow-up messages (among others) for a PTP. The time messages may include, among other fields and attributes, a correction field, which accumulates a network residence, and an origin timestamp for a CL. The time message may also comprise, for example, a packet delay message type with additional fields and attributes.

As depicted in FIG. 4, the apparatus 400 may include a software platform 402 and a hardware platform 408. The software platform 402 may include, among other software components, one or more applications 404, a clock manager 422, and a kernel 406. The clock manager 422 is similar to the clock manager 106 described with reference to FIG. 1. The hardware platform 408 may include, among other hardware components, a network interface such as a transceiver 410, clock circuitry 412, processing circuitry 414 and memory 416.

The processing circuitry 414 may include circuitry or processor logic, such as, for example, any of a variety of commercial processors. In some examples, the processing circuitry 414 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processing circuitry 414 may include graphics processing portions and may include dedicated memory, multiple-threaded processing and/or some other parallel processing capability. In some examples, the processing circuitry 414 may be an application specific integrated circuit (ASIC) or a field programmable integrated circuit (FPGA). In some examples, the processing circuitry 414 may be circuitry arranged to perform computations related to TSN, such as switching, clock leader, clock follower, routing, security, and so forth.

The memory 416 may include logic, a portion of which includes arrays of integrated circuits, forming non-volatile memory to persistently store data or a combination of non-volatile memory and volatile memory. It is to be appreciated, that the memory 416 may be based on any of a variety of technologies. In particular, the arrays of integrated circuits included in memory 406 may be arranged to form one or more types of memory, such as, for example, dynamic random access memory (DRAM), NAND memory, NOR memory, or the like.

The transceiver 410 may include logic and/or features to support a communication interface. For example, the transceiver 410 may include one or more interfaces that operate according to various communication protocols or standards to communicate over direct or network communication links. Direct communications may occur via use of communication protocols or standards described in one or more industry standards (including progenies and variants). For example, the transceiver 410 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like. In some examples, transceiver 410 may be arranged to support wireless communication protocols or standards, such as, for example, Wi-Fi, Bluetooth, ZigBee, LTE, 5G, or the like.

The TSN node 104 may also include where the network is a controller area network (CAN) or a vehicle area network (VAN). The TSN node 104 may be implemented as a device that manages a sensor, actuator or a controller. The sensors may comprise a speed sensor, a direction sensor, a global positioning system (GPS) sensor, a gas pedal sensor, a brake pedal sensor, a positioning sensor, an object detection sensor, a lane detection sensor, a radar sensor, a light detection and ranging (LIDAR) sensor, an ultrasound sensor, an inertial measurement unit (IMU) sensor, a temperature sensor, a pressure sensor, an altitude sensor, an acoustic sensor, and so forth.

In one aspect, the TSN node 104 may be implemented as a CL or CF for the TSN 102. As previously discussed, the clock manager 422 may ensure that the clock circuitry 412 maintains a network time for the TSN 102. When operating in a CL role, the clock manager 422 may send a message 112 with time information 418 representing a current network time to one or more nodes operating in a CF role for the TSN 102. When operating in a CF role, the clock manager 422 may receive a message 112 from a CL node. The clock manager 422 may use the time information 418 from the message 112 to synchronize a local device time with the current network time maintained by the clock circuitry 412.

The clock manager 422 analyzes the time information 418, and determines whether to adjust a parameter (e.g., phase or frequency) of the clock circuitry 412 to synchronize the clock circuitry 412 to the current network time.

Figure 5A:
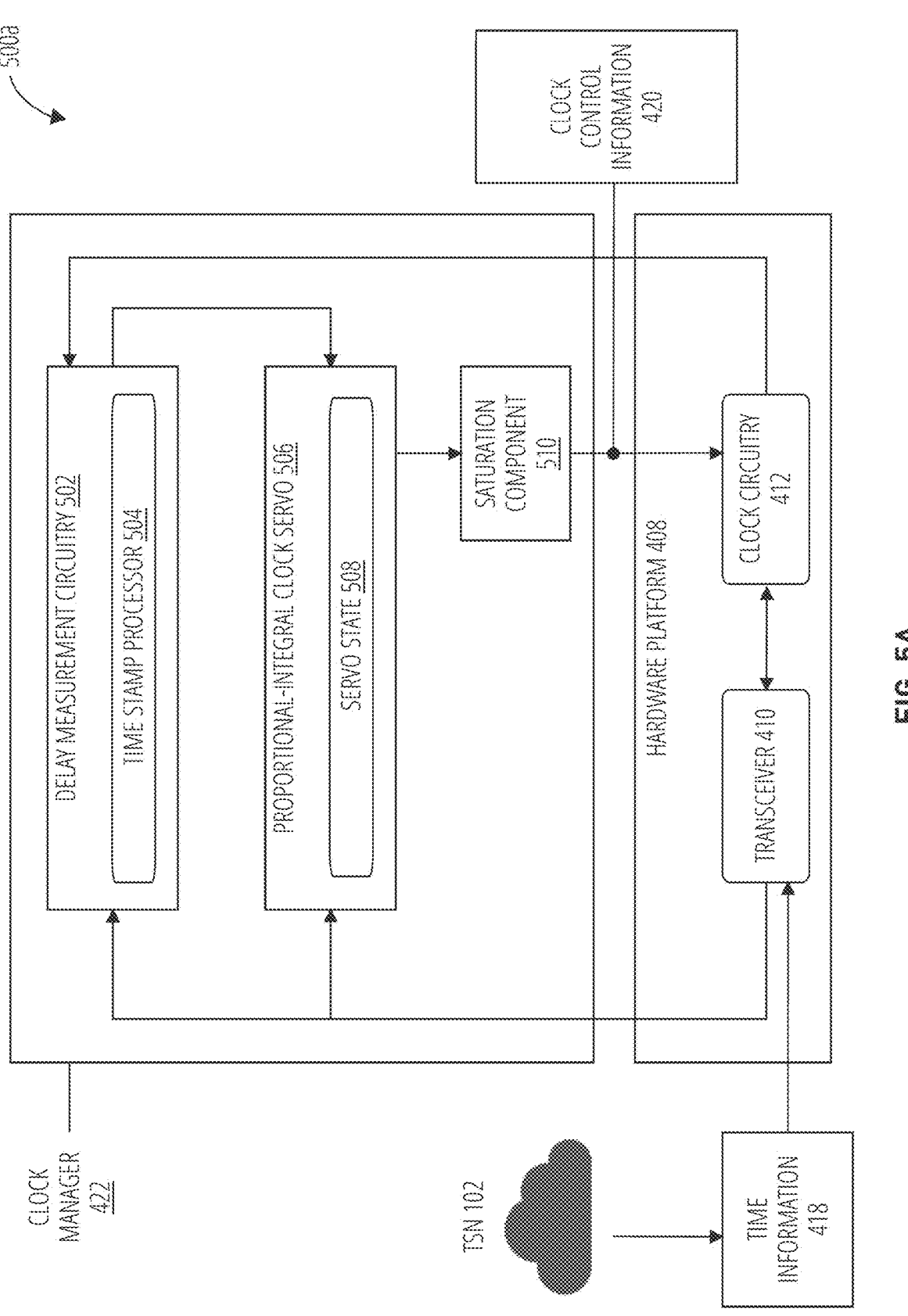
FIG. 5A illustrates an aspect of an apparatus 500a in accordance with one embodiment.

FIG. 5A illustrates a more detailed view for a clock manager 106 suitable to implement various aspects of the embodiments. As previously discussed, the clock manager 422 is a key component in clock synchronization mechanisms. The clock manager 422 tightly interacts with the transceiver 410 to obtain PTP message timestamps from the time information 418 received via messages 112 from a CL node in the TSN 102. The clock manager 422 then outputs clock control information 420 to the hardware platform 408. The clock control information 420 may represent suitable phase/frequency corrections in order to synchronize the clock circuitry 412 with a network time maintained by the CL.

As depicted in FIG. 5A, the clock manager 422 is an example of a PTP4L implementation that includes delay measurement circuitry 502 with a time stamp processor 504. The clock manager 106 further includes a proportional-integral clock servo 506 that maintains a servo state 508. The clock manager 106 also includes a saturation component 510.

The proportional-integral clock servo 506 is generally a control algorithm that periodically takes as input some measurement (or estimate) of clock offset to a reference clock, and computes as output either time (e.g., phase) or frequency adjustment to compensate for the given offset. When the kernel 406 is implemented as a Linux operating system, for example, the clock manager 422 and the proportional-integral clock servo 506 can be implemented as a PTP4L clock management module. However, embodiments are not limited to this example.

The delay measurement circuitry 502 and/or the proportional-integral clock servo 506 periodically takes as input a correction feature from a correction field in the time information 418 contained within messages 112 received by the transceiver 410.

The delay measurement circuitry 502 receives as input raw time measurements (e.g., path or link delay (pdelay) or sync/follow-up message talker origin/listener ingress timestamps) from the time information 418 and performs filtering operations to reduce measurement noise from the raw time measurements. This is because using raw or unfiltered measurements may adversely impact decisions made by the proportional-integral clock servo 506. In one embodiment, filtering is implemented as a sliding window average, where a default window length is set as 10 seconds or 80 samples for a default synchronization/follow-up period.

Filtered pdelay measurements of the time stamp processor 504 may be used to compute time offsets from a CL clock, such as clock circuitry 412 for a TSN node 104 that operates in a CF role for the TSN 102. In some cases, however, the time stamp processor 504 may alternatively give raw pdelay measurements where the filtering component is disabled. Additionally, the delay measurement circuitry 502 can compute a rate ratio, or ratio of CL clock and CF clock frequencies, based on synchronization/follow-up message timestamps (e.g., t1, t2, t3, . . . , tn).

The proportional-integral clock servo 506 may receive the filtered pdelay measurements, rate ratio, and time offset as inputs, and use the inputs to compute clock control information 420 for the clock circuitry 412. The clock control information 420 may comprise, for example, a phase or frequency adjustment for the clock circuitry 412.

Before the proportional-integral clock servo 506 sends the clock control information 420 to the clock circuitry 412, the proportional-integral clock servo 506 outputs the clock control information 420 to the saturation component 510. The saturation component 510 performs final adjustments to clock control information 420, such as ensuring the clock control information 420 does not adjust a frequency parameter for the clock circuitry 412 too quickly or beyond a maximum frequency. The saturation component 510 then outputs the clock control information 420 to the hardware platform 408.

Despite the many advantages of implementing a clock manager 422 as a PTP4L proportional-integral controller, this implementation presents security concerns. For instance, the operation of this type of controller can be compromised by adversaries targeting Linux kernel exploits, or vulnerabilities in the PTP4L implementation itself. In return, this gives attackers indirect access to cause system and application malfunction through malicious timekeeping. The attacker may influence the clock circuitry 412 by gaining execution privileges in the software domain (e.g., ring 0 and above) and altering behavior of the PTP4L software components of the clock manager 422. This may ultimately cause clock circuitry 412 misbehavior.

The attack can impact a TSN node 104 in many ways. Some examples are as follows. A first attack vector can be through sensing, where the attacker attempts to modify timing values that contribute to pdelay and offset computation before they are consumed by the proportional-integral clock servo 506. Another attack vector can be through control, where the attacker attempts to modify the control code computing actuation (e.g., frequency adjustment) based on sensing (e.g., offset). A third attack vector could be through actuation, where the attacker attempts to modify frequency adjustment values computed by the proportional-integral clock servo 506 and sent to the clock circuitry 412 for implementation. Examples of security vulnerabilities for the clock manager 106 are further described with reference to FIGS. 5B-5D.

Figure 5B:
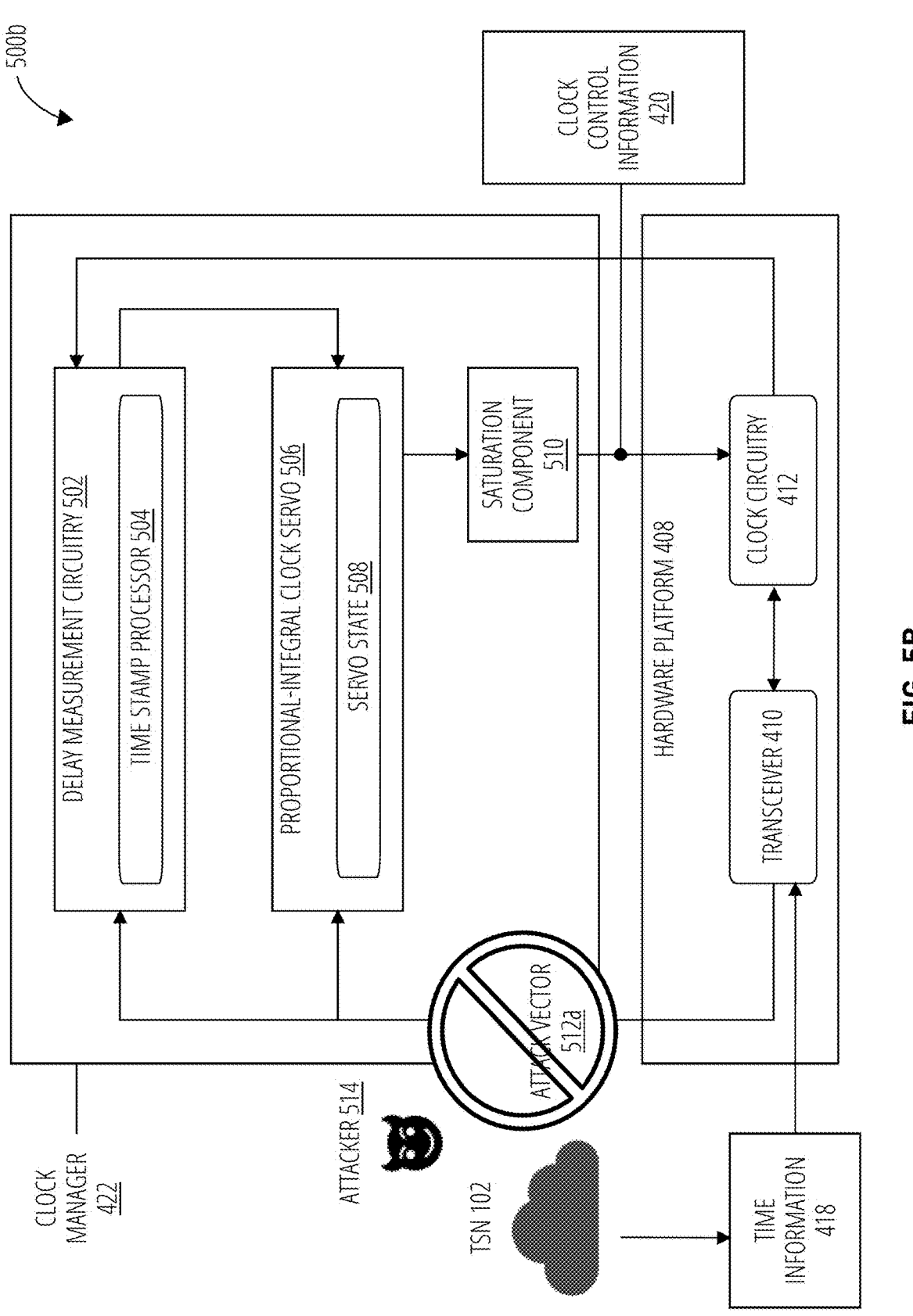
FIG. 5B illustrates an aspect of an apparatus 500b in accordance with one embodiment.

FIG. 5B illustrates the clock manager 422 under a first attack scenario. As depicted in FIG. 5B, assume an attacker 514 attempts a first attack vector 512a through sensing. The attacker 514 may attempt to modify timing values in the time information 418 after receipt by the transceiver 410 and before they are consumed by the proportional-integral clock servo 506. In other words, the first attack vector 512a is on input values for the clock manager 422.

Figure 5C:
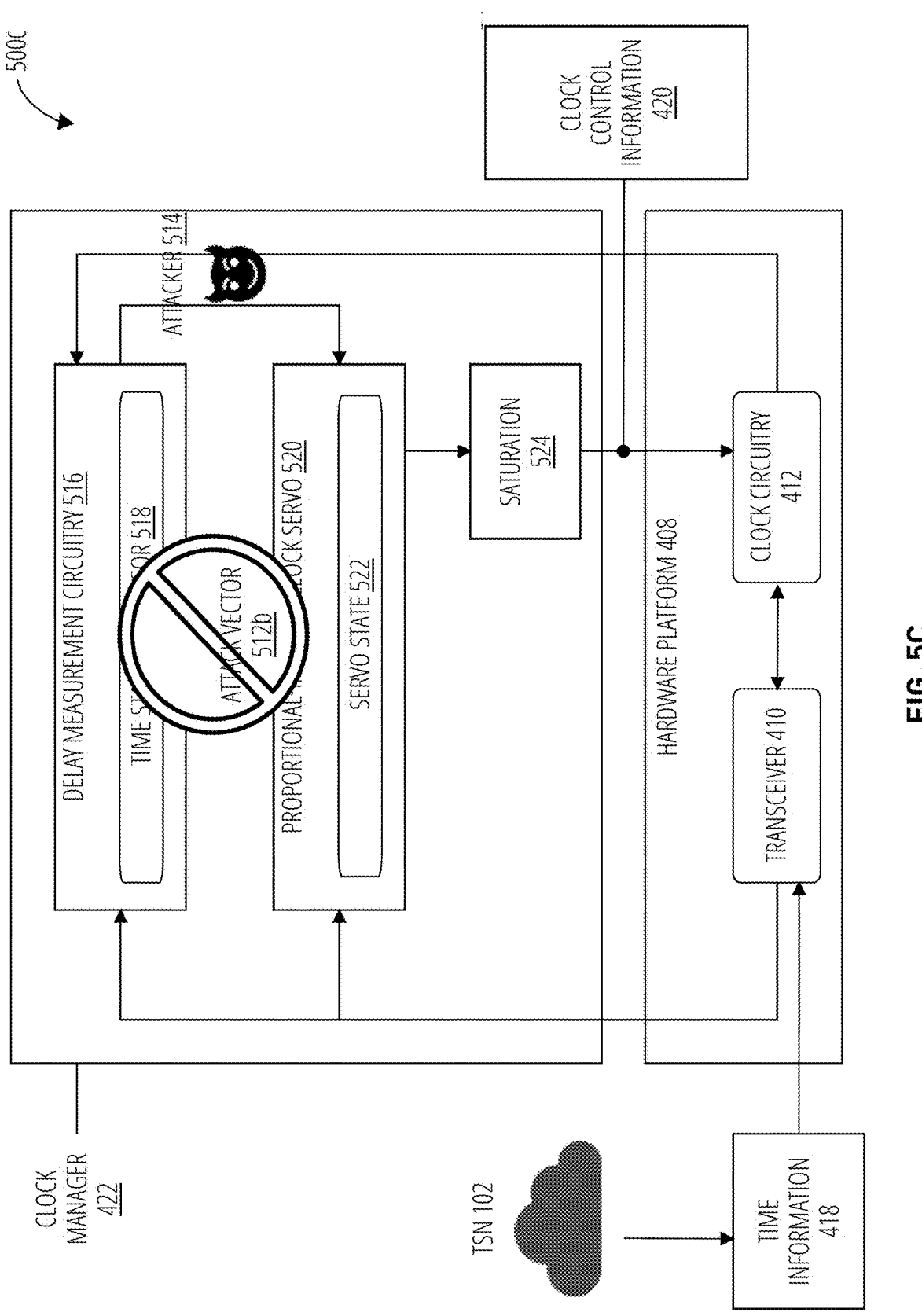
FIG. 5C illustrates an aspect of an apparatus 500c in accordance with one embodiment.

FIG. 5C illustrates the clock manager 422 under a second attack scenario. As depicted in FIG. 5C, assume the attacker 514 attempts a second attack vector 512b through control. The attacker 514 may attempt to modify the control code computing actuation (e.g., frequency adjustment) based on sensing (e.g., offset). In other words, the second attack vector 512b is on the actual code used to implement the clock manager 422.

Figure 5D:
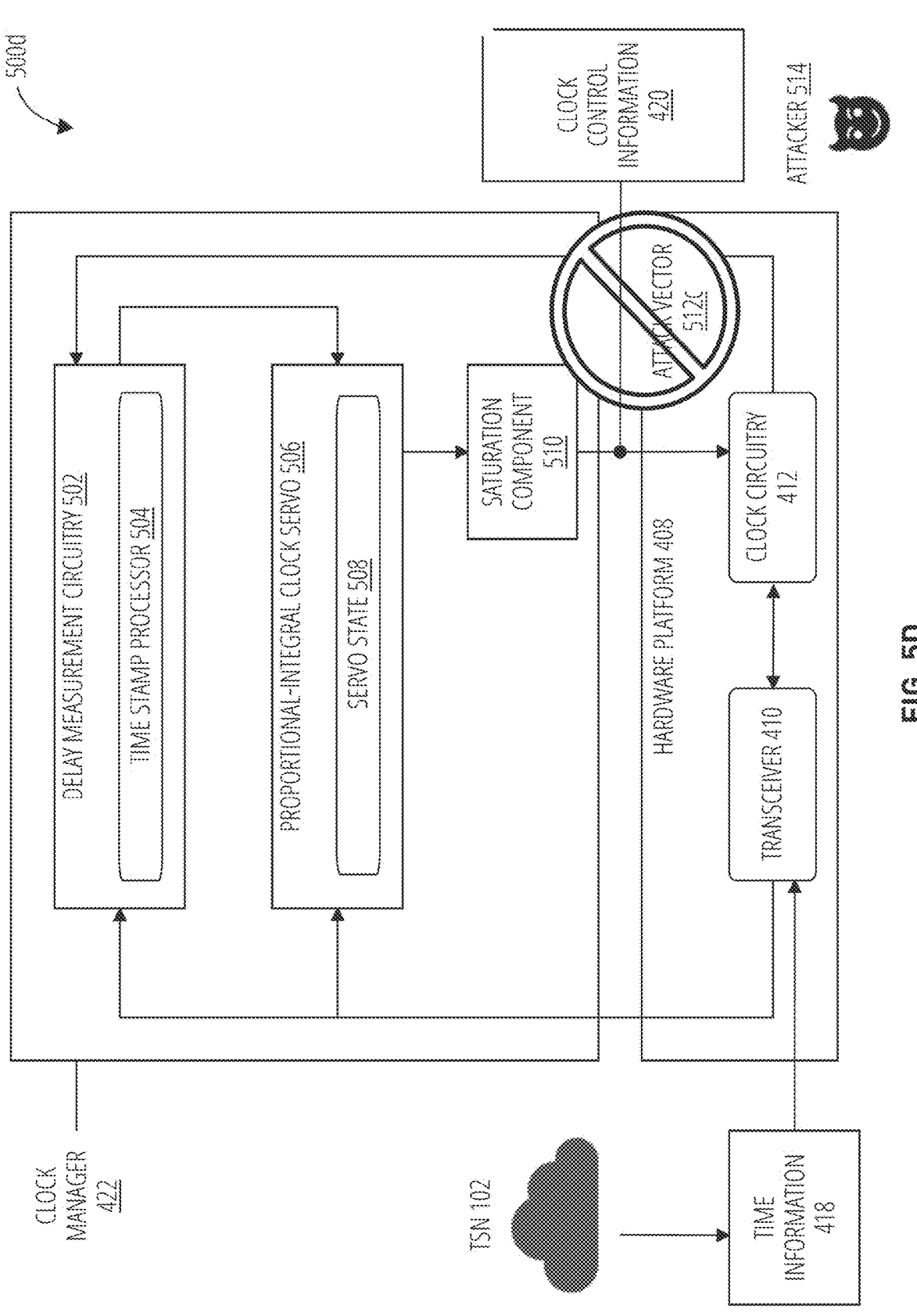
FIG. 5D illustrates an aspect of an apparatus 500d in accordance with one embodiment.

FIG. 5D illustrates the clock manager 422 under a third attack scenario. As depicted in FIG. 5D, assume the attacker 514 attempts a third attack vector 512c through actuation. The attacker 514 may attempt to modify frequency adjustment values of the clock control information 420 as computed by the proportional-integral clock servo 506 and sent to the clock circuitry 412 for implementation. In other words, the third attack vector 512c is on output values from the clock manager 422.

As illustrated in FIGS. 5A-5D, implementation of a clock manager 106 as a PTP4L proportional-integral (PI) controller presents several security concerns. However, if the clock synchronization process is described using physical models, these models can be employed as analytical redundancy, such as an equation-based copy of the system. The models can be efficiently executed at runtime in parallel to the actual clock manager 422, and serve as a basis for anomaly/attack detection. While some embodiments instantiate a modeling approach on the example of a PTP4L clock manager, it may be appreciated that the framework is not limited to PI-based clock servos.

Figure 6:
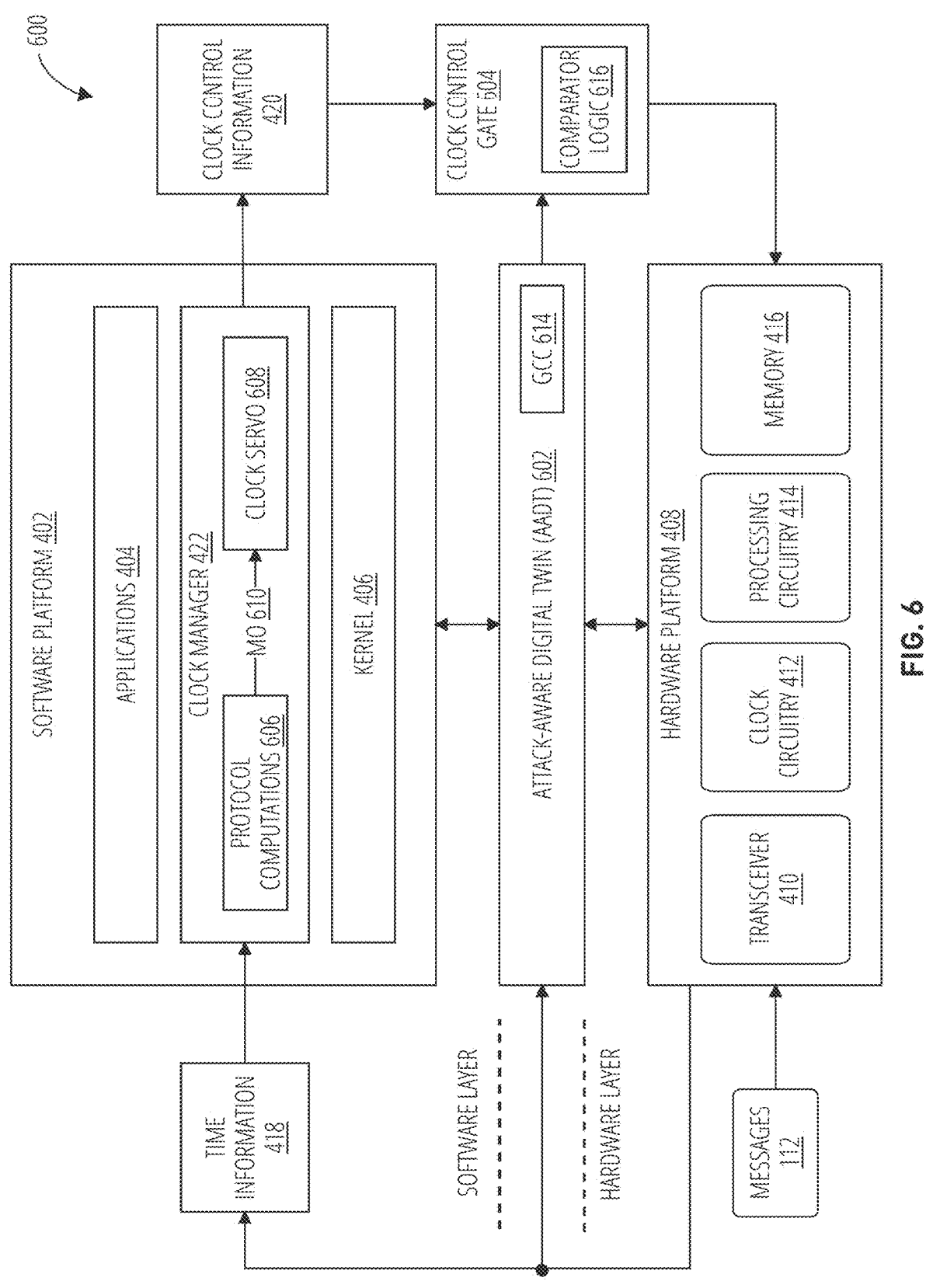
FIG. 6 illustrates an aspect of an apparatus 600 in accordance with one embodiment.

FIG. 6 illustrates an apparatus 600. Similar to the apparatus 400, the apparatus 600 includes a software platform 402 and a hardware platform 408. In addition, the apparatus 600 includes an AADT 602 to replicate operations for the clock manager 422. The AADT 602 receives the same inputs as the clock manager 422, such as consuming the time information 418 sent from the transceiver 410 to the clock manager 422 as input.

As depicted in FIG. 6, the apparatus 600 includes a clock circuitry 412 to implement a hardware clock (e.g., a PHC) for a device, such as a TSN node 104. The apparatus 600 includes a processing circuitry 414 coupled to the clock circuitry 412, the processing circuitry 414 to execute instructions to perform operations for a clock manager 422. The clock manager 422 is operative to receive messages 112 with time information 418 for a network, such as TSN 102. The clock manager 422 generates clock control information 420 to adjust the clock circuitry 412 to a network time for the TSN 102. The clock manager 422 may implement various intellectual property (IP) blocks to perform functions for protocol computations 606 and a clock servo 608 to generate the clock control information 420, as described with reference to FIGS. 5A-5C. The clock control information 420 may comprise one or more parameters to adjust the clock circuitry 412 for the apparatus 600. The one or more parameters may represent, for example, adjustments to a phase or frequency of the clock circuitry 412. For example, the clock control information 420 may comprise a phase or frequency adjustment based on a time offset between a reference time and a time maintained by the clock circuitry 412. The reference time is based on the time information 418 in at least one message 112.

The apparatus 600 further includes an AADT 602 coupled to the processing circuitry 414 and the clock circuitry 412. The AADT 602 is an example implementation for the AADT 152 described with reference to FIG. 1. The AADT 602 implements a clock manager model that emulates, simulates, replicates or models the IP blocks for the clock manager 422. For example, the clock manager model may implement IP blocks for protocol computations 606 and the clock servo 608, among others. In one embodiment, the IP blocks of the clock manager model are physics-based analytical models (e.g., equations) to represent physical relationships between components of a system, such as the proportional-integral clock servo 506.

In one embodiment, the AADT 602 may be implemented as part of a software layer for the apparatus 600, such as the software platform 402. In another embodiment, the AADT 602 may be implemented as part of a hardware layer for the apparatus 600, such as the hardware platform 408. In yet another embodiment, certain elements of the AADT 602 may be implemented in the software platform 402, while other elements of the AADT 602 may be implemented in the hardware platform 408. Embodiments are not limited in this context.

Although FIG. 6 depicts the AADT 602 implemented as part of the apparatus 600, it may be appreciated that the AADT 602 may be implemented by another apparatus, device or system communicatively coupled to the apparatus 600. For instance, the AADT 602 may be implemented as part of an intrusion detection system (IDS) for the apparatus 600 that is separate from the apparatus 600 or a device other than a device that implements the apparatus 600. For instance, if the apparatus 600 is implemented by a TSN node 104a, the AADT 602 of the apparatus 600 could optionally be implemented in a TSN node 104b. The AADT 602 could also be implemented by an IDS communicatively coupled to the TSN node 104, either directly via a wired or wireless connection, or indirectly via the TSN fabric 114. Embodiments are not limited in this context.

In operations, the AADT 602 is operative to consume the clock control information 420 in transit from the clock manager 422 of the software platform 402 and the hardware platform 408. For instance, the AADT 602 can consume software control messages, or it can have one or more taps on a hardware bus or signal lines used to communicate electrical signals to the hardware platform 408. The AADT 602 consumes the time information 418 and attempts to simulate, replicate, or model the clock control information 420. The AADT 602 remains in a "hot" standby mode and is ready to take over clock management operations from the clock manager 422 immediately upon activation or connection to the clock circuitry 412 for the clock.

The apparatus 600 further includes a clock control gate 604. The clock control gate 604 controls access to clock circuitry 412 of the hardware platform 408. The clock control gate 604 may be implemented as a hardware switch, a software switch, or a combination of both. Given the tight time constraints typically associated with a TSN node or TSN application, the TSN node will typically implement a hardware switch for faster performance. In some cases, however, a TSN node could implement a software switch depending on a set of performance parameters for a given TSN node. Embodiments are not limited in this context.

During operations of the TSN node, the clock manager 422 receives time information 418 from TSN messages 112, and it calculates clock control information 420 to adjust the clock circuitry 412 so that the clock remains synchronized with a network time for the TSN. In addition, the AADT 602 receives the same time information 418 as the clock manager 422, via hardware or software taps, and it calculates model clock control information to adjust the clock circuitry 412. In one embodiment, the model clock control information may include one or more malicious time samples. In this case, the malicious time samples are identified and removed from the model clock control information to form sanitized clock control information. This process is further described with reference to FIG. 7. A clock control gate 604 receives both the clock control information 420 from the clock manager 422 and the sanitized clock control information from the AADT 602. The AADT 602 implements gate control logic 614 for controlling gating operations of the clock control gate 604, and it determines whether to pass the clock control information 420 or the sanitized clock control information to the clock circuitry 412 based on a particular configuration for the AADT 602.

In one embodiment, for example, the AADT 602 controls gating operations based on explicit evidence of an attack. For example, an IDS may monitor operations for a TSN node, and it sends a security alert to the AADT 602 that an attack is occurring within the TSN node or other TSN nodes in the TSN. The gate control logic 614 of the AADT 602 then sends one or more control directives, such as configuration signals, to the clock control gate 604 to configure it to block the clock control information 420 from the clock manager 422 and pass the sanitized clock control information from the AADT 602. In the absence of explicit evidence of an attack, such as in normal operating conditions for the TSN node, the gate control logic 614 of the AADT 602 sends one or more control directives, such as configuration signals, to the clock control gate 604 to configure it to pass the clock control information 420 from the clock manager 422 and block the sanitized clock control information from the AADT 602.

In one embodiment, for example, the AADT controls gating operations based on implicit evidence of an attack. For example, the clock control gate 604 may implement comparator logic 616 that continuously compares the clock control information 420 from the clock manager 422 with the sanitized clock control information from the AADT 602 to find a difference value (e.g., a residual signal). When the difference value is above a certain defined threshold, thereby indicating influence of an attack, the clock control gate 604 blocks the clock control information 420 and passes the sanitized clock control information to the clock circuitry 412. When the difference value is below a certain defined threshold, thereby indicating normal TSN operations, the clock control gate 604 passes the clock control information 420 and blocks the sanitized clock control information to the clock circuitry 412. This process occurs on a continuous basis, and once an attack is detected, the AADT 602 can smoothly and accurately take over clock manager operations for the TSN node until the attack is mitigated. In this manner, the TSN node can continue normal operations supporting TSN applications within the TSN without disruption or failure, even in the presence of an ongoing attack.

Figure 7:
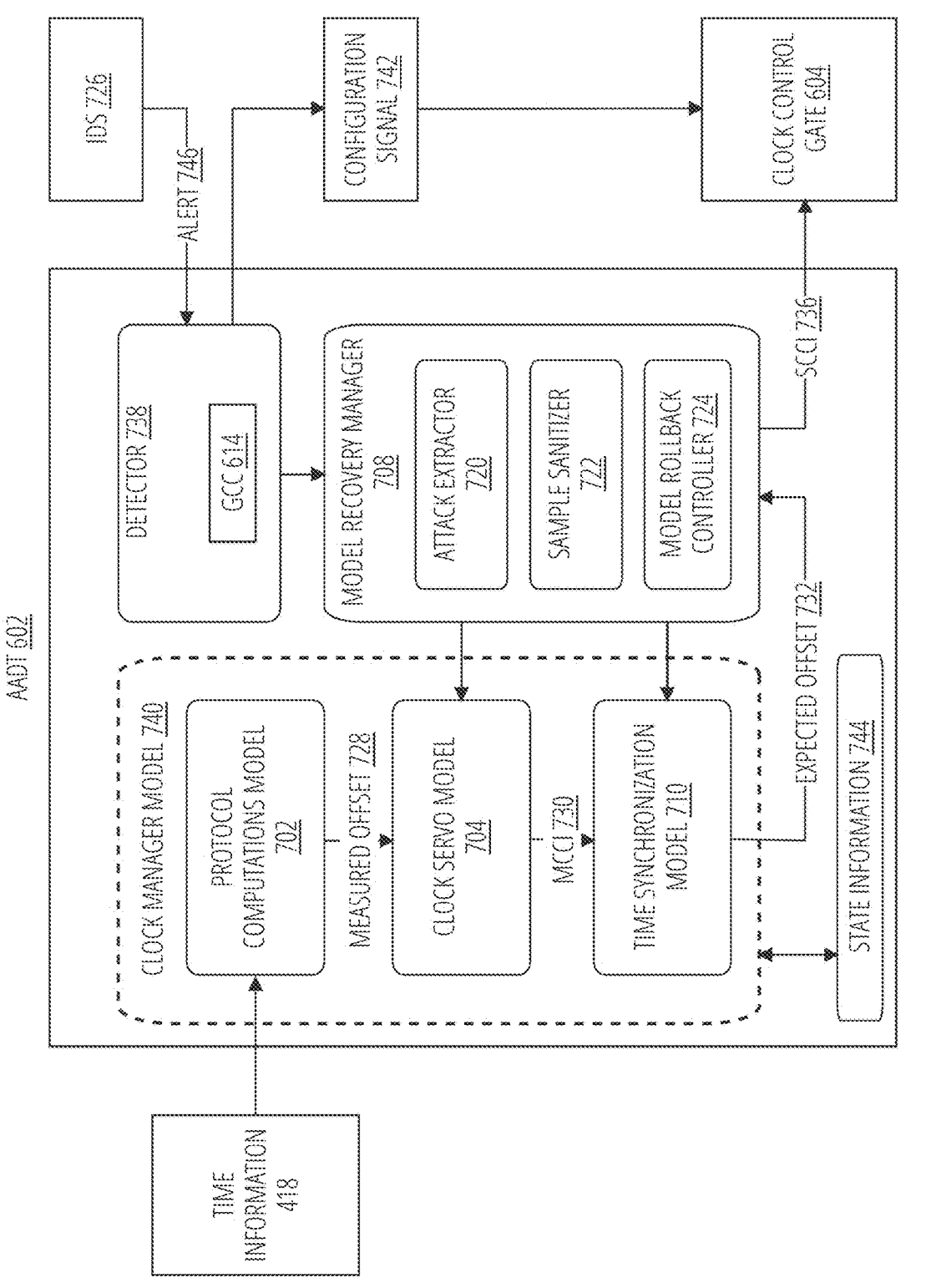
FIG. 7 illustrates an aspect of an attack-aware digital twin (AADT) in accordance with one embodiment.

FIG. 7 illustrates a more detailed view of the AADT 602. As depicted in FIG. 7, the AADT 602 may include various IP blocks or sub-blocks, such as a clock manager model 740, a model recovery manager 708, and a detector 738. As depicted in FIG. 7, the clock manager model 740 may comprise a protocol computations model 702, a clock servo model 704, and a time synchronization model 710. The model recovery manager 708 may comprise an attack extractor 720, a sample sanitizer 722, and a model rollback controller 724. A detector 738 may implement the gate control logic 614. The detector 738 is communicatively coupled to an IDS 726. The IDS 726 may be internal or external to a TSN node implementing the AADT 602.

As previously described with reference to FIG. 6, the gate control logic 614 generates a configuration signal 742 to configure settings or parameters for the clock control gate 604. During benign operating conditions for the TSN 102, the gate control logic 614 sends a configuration signal 742 to configure the clock control gate 604 to pass the clock control information 420 from the clock manager 422 and block the sanitized clock control information 736 from the AADT 602. In one embodiment, this may be a default configuration for the clock control gate 604. During attack operating conditions for the TSN 102, the detector 738 receives an alert 746 from the IDS 726 indicating the TSN 102 is experiencing abnormal operating conditions that may be indicative of an attack. The gate control logic 614 sends a configuration signal 742 to configure the clock control gate 604 to pass sanitized clock control information 736 from the AADT 602 and block the clock control information 420 from the clock manager 422.

As previously described with reference to FIG. 6, the apparatus 600 illustrates an example of a high-level overview of an apparatus for a CF connected to the TSN 102. As timestamps resulting from PTP packets are being consumed by the clock manager 422, they are first used to compute a time offset to the CL by protocol computations 606. The measured offset is then input in the clock servo 608 which computes the clock control information 420 for the local clock of the clock circuitry 412. This cycle repeats at every time synchronization period, which is typically multiple times a second. An attacker present in the TSN 102 can modify some of the receiving timestamps, skewing the protocol computations, and infiltrating the clock servo 608 with malicious offset inputs. Consequently, such an attack achieves driving of the local clock of the CF away from the CL through the maliciously influenced clock control signal.

FIG. 7 depicts a more detailed example for the AADT 602 that attempts to replicate the clock management operations performed by the clock manager 422. The AADT 602 is a digital twin of the clock manager 422 that is based on physics-aware models. Such models capture the response of a physical plant (e.g., a time synchronization process) to actuation inputs (e.g., clock adjustment) and offer an analytical representation of the key aspects of system's behavior. Physics-aware models can be obtained using a variety of system identification techniques, where a series of input-output measurements are provided to the algorithm, along with a desired model structure (e.g., transfer function, state space), while the algorithm returns model parameters. These models can then be executed at system runtime, to obtain an expectation of what the response of the real system should be given the dynamic input.

As described with reference to FIGS. 5A-D, the clock manager 422 may be implemented as a PTP4L clock manager software module. The PTP4L clock manager software module is a physics-based controller, which is derived based on control theoretic principles, as is the case with most prominent clock servos for Linux. Since the proportional-integral clock servo 506 is a physics-based controller, an optimal modeling technique is a physics-based one. Any other technique, such as those based on statistical behavior, will likely be suboptimal for security operations.

In one embodiment, the AADT 602 may implement a clock manager model 740 that comprises a physics-based analytical model to represent physical relationships between components of a system. The physics-based analytical model is implemented as an equation-based representation of a behavior of the clock manager 422. More particularly, the physics-based analytical model is implemented as an equation-based representation of a clock servo controller, such as the proportional-integral clock servo 506, as well as the time stamp processor 504 and the delay measurement circuitry 502, among other components of the clock manager 422. The physics-based approach for the clock manager model 740 utilizes state prediction based on physical models of system dynamics. Unlike conventional information-based security measures, the physics-based model may utilize physical properties of a system, along with controller state estimation, to enable computationally-inexpensive analytical redundancy. For example, a mathematical model-based replica of the system is simultaneously executed to detect attacks.

The AADT 602 is not only able to follow the states of the clock servo 608 but also capable of correcting the effects of malicious inputs applied to the clock hardware (e.g., system time). As shown in FIG. 7, the AADT 602 instantiates a clock manager model 740 that replicates various IP blocks of the clock manager 422 for a TSN node 104 in the TSN 102. For example, the clock manager model 740 includes a protocol computations model 702 that corresponds to the protocol computations 606 block of the clock manager 422.

The clock manager model 740 further includes a clock servo model 704 that corresponds to the clock servo 608 block of the clock manager 422.

The protocol computations model 702 replicates the protocol computations 606 block of the clock manager 422. The protocol computations model 702 receives the time information 418, and uses the time information 418 to generate a measured offset 728 based on a set of equations and algorithms implemented for a given set of TSN protocols implemented for the TSN 102, such as IEEE 1588, IEEE 802.1AS, IEEE 802.1Qbv, IEEE 802.15.4, or the like. The protocol computations model 702 consumes the same time information 418 (e.g., timestamps) from the network as the protocol computations 606 block of the clock manager 422 in real-time. The protocol computations model 702 calculates a measured offset 728 ($O_m$) from the time information 418. The measured offset 728 corresponds to the measured offset 610 of the clock manager 422. The protocol computations model 702 outputs the measured offset 728 to the clock servo model 704.

The clock servo model 704 replicates the clock servo 608 block of the clock manager 422. The clock servo model 704 receives as input the measured offset 728, and it generates or produces model clock control information 730, such as a frequency adjustment (f) or a phase adjustment (p). The model clock control information 730 corresponds to the clock control information 420 of the clock manager 422. The clock servo model 704 outputs the model clock control information 730 to the time synchronization model 710.

In addition to replicating IP blocks from the clock manager 422, the clock manager model 740 also includes a time synchronization model 710 that replicates the clock circuitry 412 of the apparatus 600 implemented by a TSN node 104. The time synchronization model 710 receives as input the model clock control information 730, and it generates or produces an expected offset 732 ($O_{exp}$). The expected offset 732 corresponds to an actual offset performed by the clock circuitry 412 when applying the clock control information 420. The time synchronization model 710 outputs the expected offset 732 to the model recovery manager 708.

The clock manager 422 continuously performs clock management operations that consume the time information 418 from the messages 112 and generate clock control information 420 from the time information 418 to adjust a frequency or a phase of the clock circuitry 412. The clock manager model 740 operates in parallel to the clock manager 422 to replicate the same clock management operations as the clock manager 422 with a defined level of precision required for a given TSN node or TSN application reliant on the TSN node. The clock manager model 740 periodically or continuously saves state information 744 for the various physics-based models for each synchronization cycle.

The model recovery manager 708 of the AADT 602 uses the state information 744 to roll-back or roll-forward states for the physics-based models of the clock manager model 740 when attempting to correct for malicious time samples introduced by an attacker 514 performing a time desynchronization attack on the TSN 102. More particularly, the model recovery manager 708 implements an attack prevention pipeline that includes operations for: (1) real-time quantification of attacker's influence (post detection); (2) extract attacker's influence from TSN features before consumption; (3) roll back digital twin models to remove malicious samples; and (4) roll forward with sanitized TSN features. The model recovery manager 708 may perform other model recovery operations as well. Embodiments are not limited in this context.

The model recovery manager 708 is designed to consume the expected offset 732 from the time synchronization model 710, and it uses the expected offset 732 to remove any malicious time samples from the model clock control information 730. Under benign operating conditions, the model clock control information 730 does not include any malicious time samples. Under attack operating conditions, however, the model clock control information 730 does include malicious time samples. The model recovery manager 708 makes this determination based on the expected offset 732. When the model recovery manager 708 determines that the model clock control information 730 does include malicious time samples, it removes the malicious time samples from the model clock control information 730, and outputs sanitized clock control information 736 ($O_{sani}$). The sanitized clock control information 736 comprises the model clock control information 730 that is sanitized to remove any deleterious effects from the malicious time samples. The sanitized clock control information 736 may then be suitable for use to perform clock adjustments to the clock circuitry 412, thereby allowing the TSN node 104 to continue to perform normal operations even in the presence of an attacker 514.

The model recovery manager 708 includes an attack extractor 720. The attack extractor 720 measures an attack amplitude ($O_{attk}$) of a time desynchronization attack. The attack amplitude is an amount of time offset introduced by the attacker 514 for a given synchronization cycle. The attack extractor 720 compares the expected offset 732 with the measured offset 728 to find a difference value (e.g., a residual). The difference value represents the attack amplitude. When the difference value is below (or above) a defined threshold, this indicates that the TSN 102 is behaving as expected and there is no active attacker 514 in the network. When the difference value is above (or below) a defined threshold, however, this indicates that an attacker 514 is attacking the TSN 102. The attack extractor 720 outputs the attack amplitude to the sample sanitizer 722.

Once the attack extractor 720 quantifies and extracts the time offset introduced by the attacker 514, the sample sanitizer 722 is used to eliminate the effects of the attack samples from the input. As an additional feature, the sample sanitizer 722 flushes any effects of the attack from the AADT 602 as well, thereby allowing the AADT 602 to continue to operate in replacement of the clock manager 422 for more than one synchronization cycle.

The sample sanitizer 722 removes malicious time samples from the model clock control information 730. Consider an attacker 514 in the network that is maliciously changing the network timestamps that are necessary to maintain time synchronization with the CL. These malicious samples when consumed by the clock servo model 704 leads to incorrect model clock control information 730. The AADT 602 is used to accurately follow the states of the system. The protocol computations model 702 consumes the timestamps from the time information 418, and it calculates the measured offset 728 ($O_m$). The clock servo model 704 consumes the measured offset 728, and it calculates the model clock control information 730, such as a frequency (f). The time synchronization model 710 consumes the model clock control information 730, and it calculates an expected offset 732. When there is no active attacker 514 in the network, the $O_m$ produces a correct f, which in turn produces an expected offset 732. In the benign case (no attacker), $O_{exp}$ will closely match the $O_m$.

However, consider a network attacker 514 that is maliciously changing the network timestamps that are necessary to maintain time synchronization with the CL. These malicious samples when consumed by the time synchronization model 710 produces an incorrect $O_{exp}$. The difference between the expected versus measured time offset is used to calculate the amplitude of the attack ($O_{attk}$). The $O_{attk}$ is then removed from the current sample resulting in a sanitized clock control information 736 ($O_{sani}$). In other words, this is the time offset that should be applied to the system if there was no attacker 514 present. The $O_{sani}$ can then be applied to the clock circuitry 412 to ensure no attack influence reaches the system. For example, the Osani can be calculated as $O_{sani}=O_m-O_{attk}$. In this case, the influence of the attack is removed to produce the sanitized signal. The full process of sanitizing comprises producing the $O_{sani}$, rolling back the AADT 602 to a previous state (e.g., without attack), and rolling forward the AADT 602 with $O_{sani}$.

Consuming the attack samples into the AADT 602 is necessary to produce $O_{sani}$ during a given synchronization cycle. However, the model recovery manager 708 also needs to correct state changes that have occurred within the AADT 602 due to the influence of the attack to have sustained prevention for future synchronization cycles. To accomplish this function, the model recovery manager 708 includes a model rollback controller 724.

The model rollback controller 724 performs two main functions. First, the model rollback controller 724 rolls back the clock servo model 704 and the time synchronization model 710 of the clock manager model 740 to remove malicious samples from the state information 744 of the clock manager model 740. The states of the controller are saved for each iteration and when an attack is detected the $O_{sani}$ is produced and the saved previous states are then restored. Second, the model rollback controller 724 rolls forward the clock servo model 704 and the time synchronization model 710 of the clock manager model 740 using the sanitized clock control information 736 ($O_{sani}$), since $O_{sani}$ represents a correct time offset that should be applied to the system without the influence of the attacker 514. The $O_{sani}$ is the value without the influence of the attack and is applied to the system. This is then applied to the AADT model as well and new states for the AADT 602 are produced. These new states are further used for the next iteration to continue to sanitize the offset without allowing the attacker to reach the system.

The model rollback controller 724 performs these operations for every synchronization cycle. In this manner, the model rollback controller 724 can continue to correct for the influence of the attacker 514 for future synchronization cycles until the attacker 514 is mitigated.

Figure 8A:
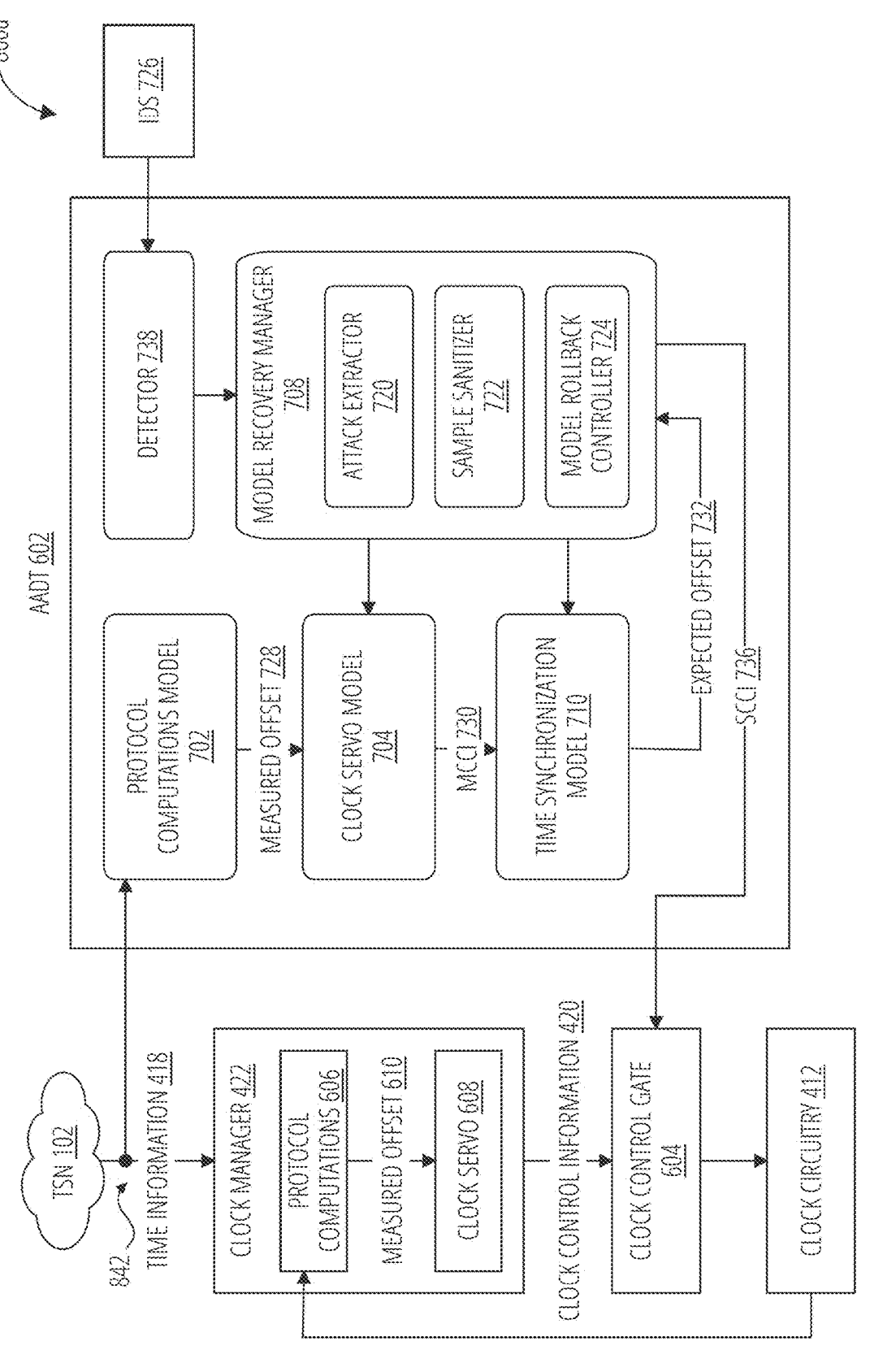
FIG. 8A illustrates an aspect of an apparatus 800a in accordance with one embodiment.

FIG. 8A illustrates an apparatus 800a. As depicted in FIG. 8A, a clock manager 422 and an AADT 602 operate in combination to switch a connection path between the clock manager 106 and the clock circuitry 412 to a connection path between the AADT 152 and the clock circuitry 412.

As depicted in FIG. 8A, the apparatus 800a illustrates an example implementation for a TSN node 104 similar to the apparatus 600. As with the apparatus 600, the apparatus 800a includes the clock manager 422, the clock circuitry 412, and the clock control gate 604 between the clock manager 422 and the clock circuitry 412. In addition, the apparatus 800a includes an AADT 602 executing in parallel to the clock manager 422. In one embodiment, the clock manager 422 and the AADT 602 are executed by a same processing circuitry, such as processing circuitry 414. In one embodiment, the clock manager and the AADT 602 are executed by difference processing circuitry. The former embodiment protects against an attack on other TSN nodes 104 in the TSN 102. The latter configuration helps protect against an attack on the TSN node 104 executing the AADT 602.

Figure 10:
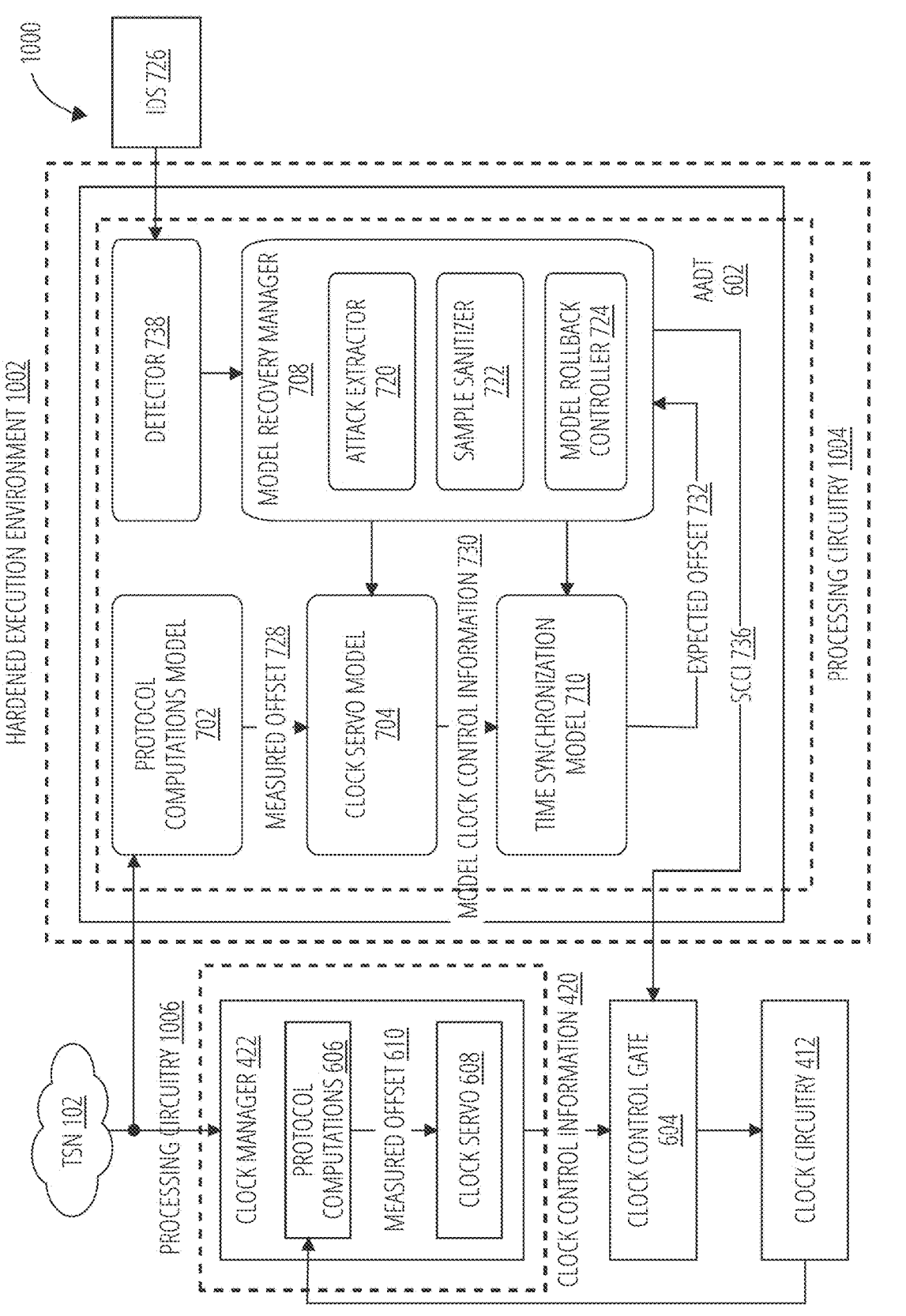
FIG. 10 illustrates an aspect of a system 1000 in accordance with one embodiment.

In one embodiment, for further protection from attacks, the AADT 602 is executed by processor circuitry contained within a hardened execution environment as described further in FIG. 10. The AADT 602 is a physics-aware backup that executes on separate processing circuitry, such as within a hardened execution environment, from the processing circuitry executing the clock manager 422. In this manner, the AADT 602 provides analytical redundancy outside of a reach of the attacker 514 and isolates the AADT 602 from infections from the clock manager 422. The AADT 602 may be designed to take over operations for the clock manager 422 in response to the alert from the IDS 726.

In one embodiment, the apparatus 800a is a CF that receives time information 418 from a CL of the TSN 102. The time information 418 is processed by the hardware platform 408, and is sent to the clock manager 422. A direct tap 842 to a communications bus directs the same time information 418 to the AADT 602. The direct tap 842 reduces a risk that signals received by the network interface of the hardware platform 408 and sent as input to the clock manager 422 are under influence of an attacker. For instance, an attacker may attempt to intercept and modify the time information 418 to affect sensing by the clock manager 422 of one set of values, and report another set of values to the AADT 602. The direct tap 824 reduces this risk and thereby improves security for the AADT 602.

The clock manager 422 receives as input the time information 418, and it outputs the clock control information 420, as described with reference to FIG. 6. At approximately the same time, the AADT 602 receives as input the time information 418, and it outputs the sanitized clock control information 736, as described with reference to FIG. 7. Both outputs are received as inputs to the clock control gate 604. The clock control gate 604 is configured to pass one of the two output signals.

In one embodiment, the gate control logic 614 of the detector 738 configures the clock control gate 604. Under benign conditions, the clock control gate 604 is configured to pass the output from the clock manager 422 to the clock circuitry 412. Under attack conditions, the clock control gate 604 is configured to pass the output from the AADT 602 to the clock circuitry 412. The clock circuitry 412 updates the clock in accordance with one of the outputs signals, and it outputs the result to the clock manager 422 in a continuous feedback loop.

In one embodiment, the clock control gate 604 implements the comparator logic 616 to compare both output signals to determine a residual value which represents a deviation from expected behavior of the clock manager 422. When the residual value is below (or above) a defined threshold, the clock control gate 604 assumes benign conditions, and it passes the output from the clock manager 422. When the residual value is above (or below) a defined threshold, the clock control gate 604 assumes attack conditions, and it passes the output from the AADT 602. The defined threshold is implementation specific, and is typically set to a value in parts-per-billion (ppb) for frequency adjustments, or nanoseconds (ns) for phase adjustments. In one embodiment, as an example of defined thresholds for frequency adjustments, the defined threshold may be set to be equal to or greater than 0.1 ppb, 1 ppb, 5 ppb, 10 ppb, and so forth. Embodiments are not limited in this context.

Figure 8B:
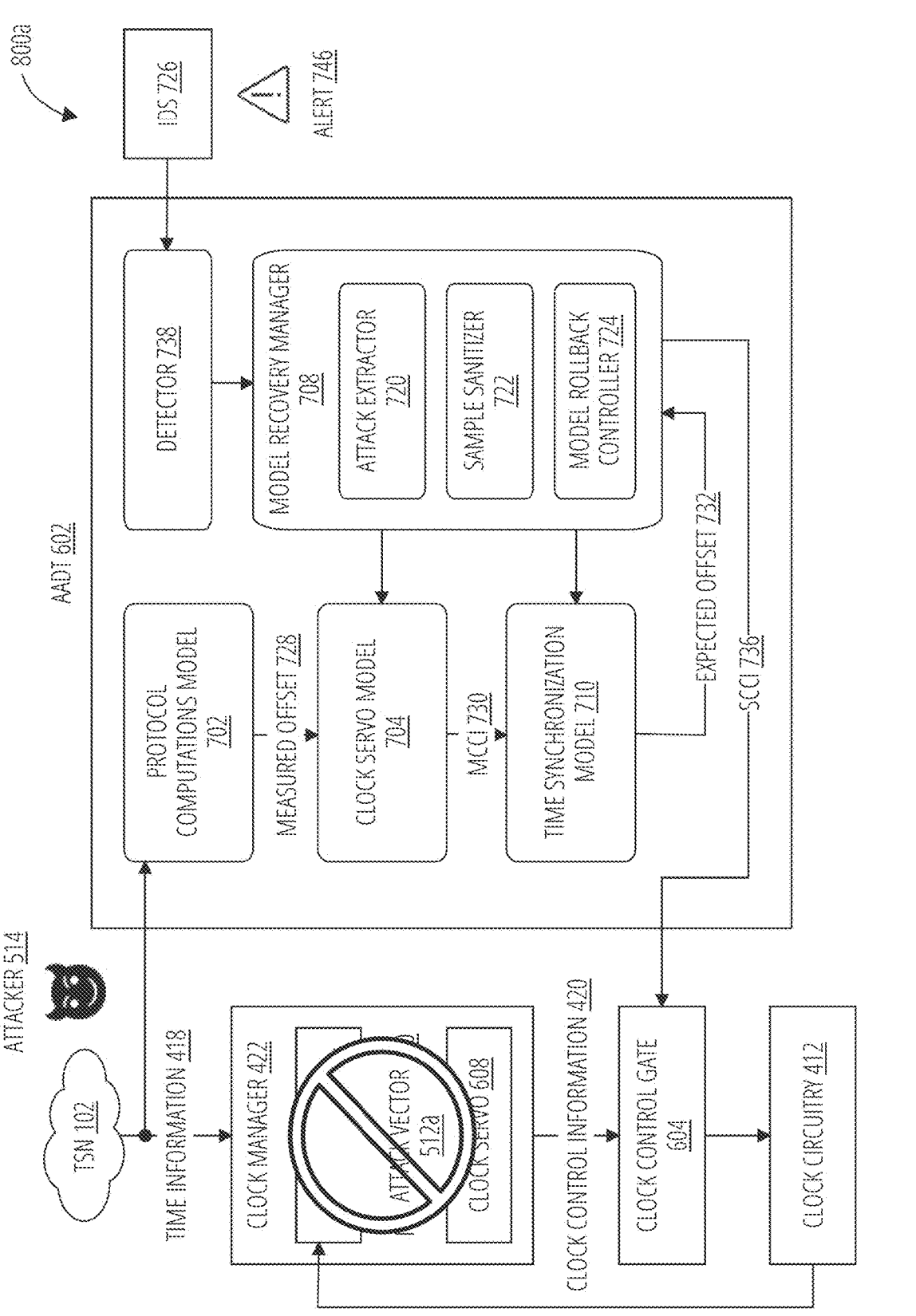
FIG. 8B illustrates an aspect of an apparatus 800a in accordance with one embodiment.

FIG. 8B illustrates the apparatus 800a when a TSN node 104 in the TSN 102 is compromised due to a security attack by an attacker 514 along an attack vector 512a. The AADT 602 receives an alert 746 from the IDS 726. In response to the alert 746, the AADT 602 assumes the clock manager 422 is either compromised or consuming incorrect time information 418 from the TSN 102. The gate control logic 614 sends a configuration signal 742 to the clock control gate 604 to pass the output from the AADT 602 and block the output from the clock manager 422. The clock control gate 604 allows the AADT 602 to output sanitized clock control information 736 (e.g., phase/frequency adjustments) to the clock circuitry 412 to adjust timing for the clock. The sanitized clock control information 736 operates as substitute timing control signals for the clock control information 420.

Figure 8C:
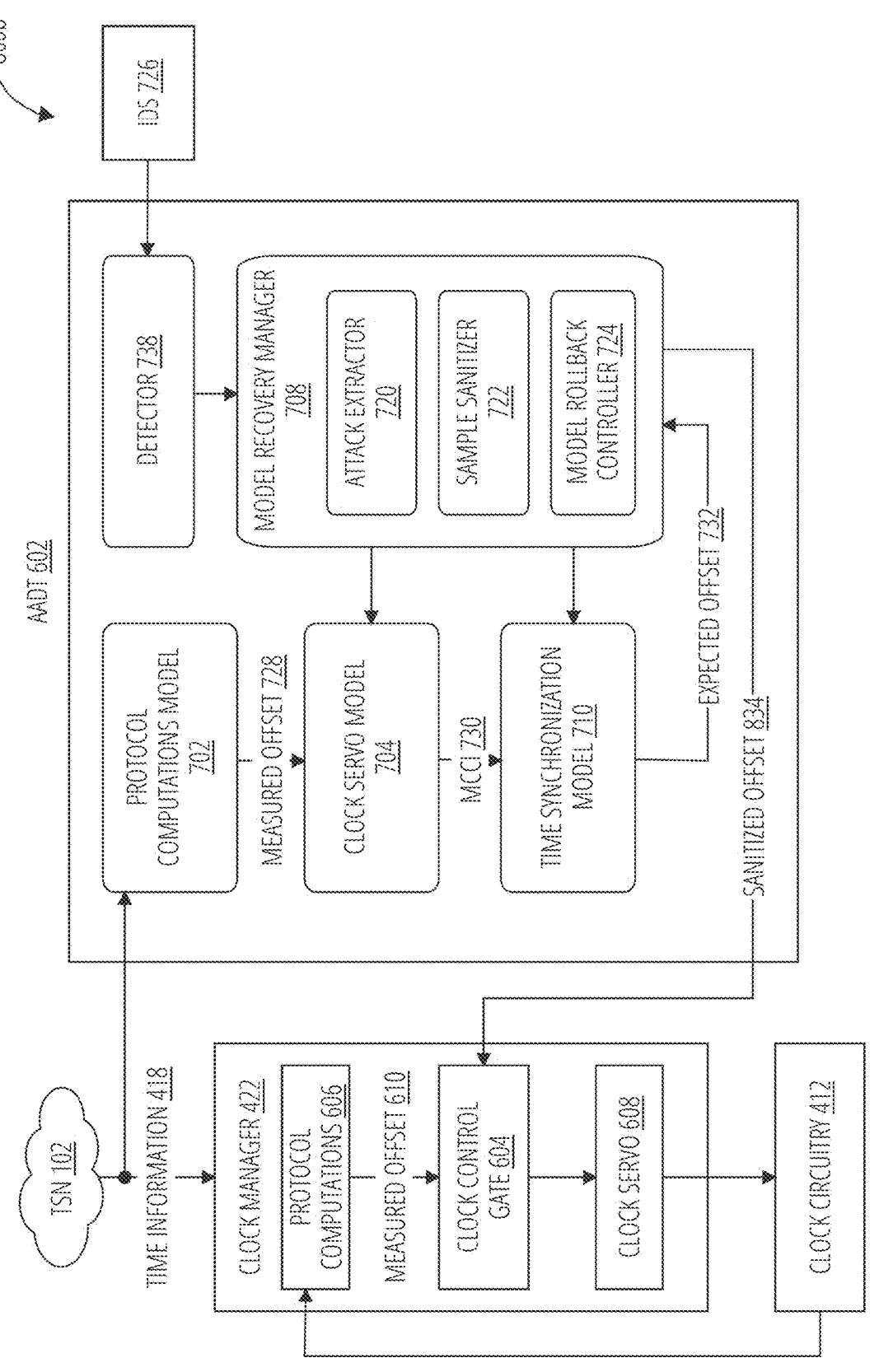
FIG. 8C illustrates an aspect of an apparatus 800b in accordance with one embodiment.

FIG. 8C illustrates an apparatus 800b. The apparatus 800b is similar to the apparatus 800a. Instead of the clock control gate 604 positioned between the clock manager 422 and the clock circuitry 412, however, the clock control gate 604 is positioned between the protocol computations 606 block and the clock servo 608 block of the clock manager 422. In this embodiment, the measured offset 610 is replaced by the sanitized offset 834. The sanitized offset 834 is similar to the sanitized clock control information 736, wherein the sample sanitizer 722 removes malicious time samples from the measured offset 728 to produce the sanitized offset 834. The clock control gate 604 then gates between the measured offset 610 and the sanitized offset 834 depending on a configuration signal 742 from the gate control logic 614 of the detector 738. The clock servo 608 receives as input either the measured offset 610 or the sanitized offset 834, and it calculates the clock control information 420. The clock servo 608 then outputs the clock control information 420 to the clock circuitry 412 to perform frequency or phase adjustments to the clock.

Figure 9A:
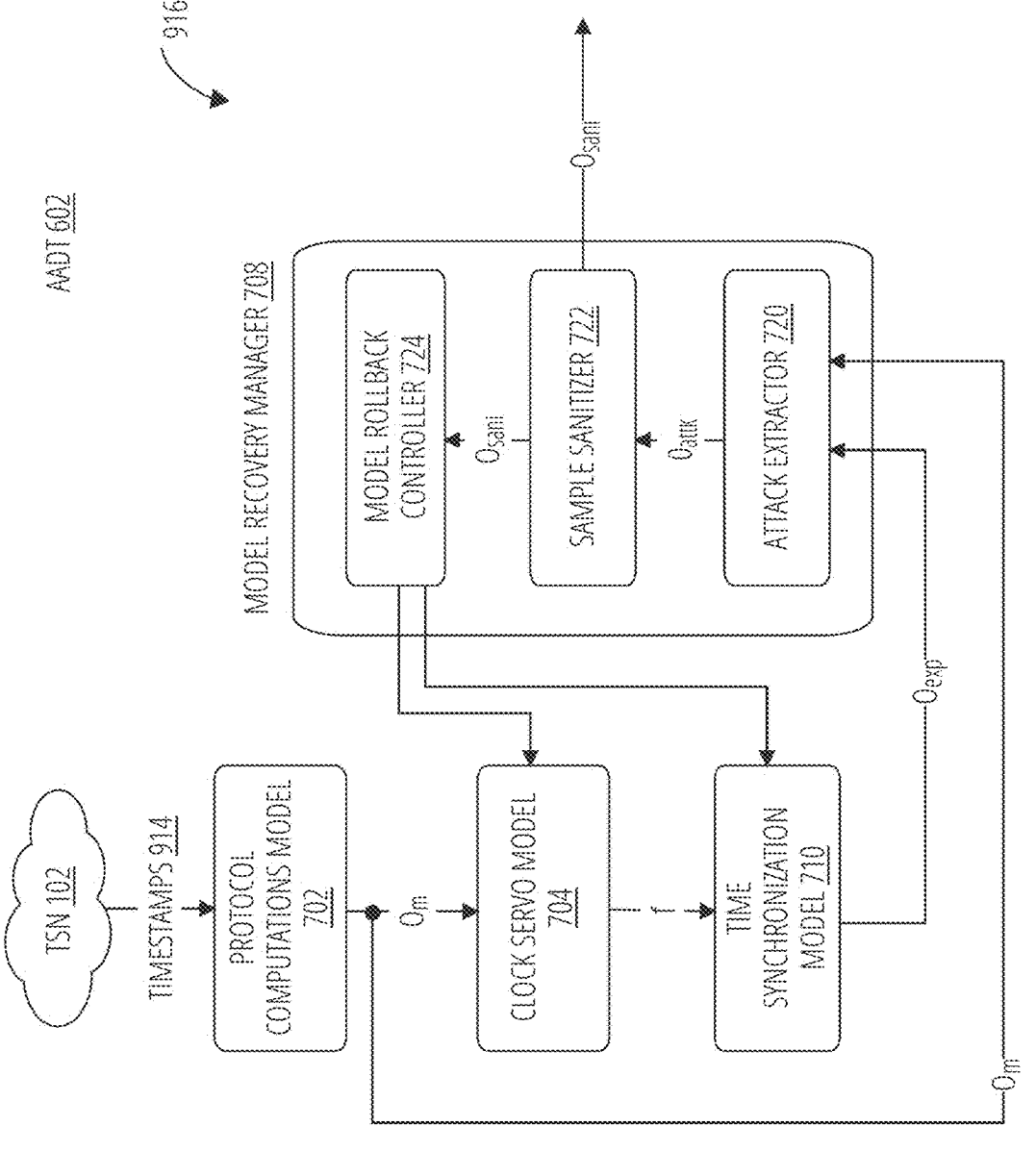
FIG. 9A illustrates an aspect of an AADT 602 in accordance with one embodiment.

FIG. 9A illustrates an apparatus 916, which is a more detailed diagram for the AADT 602 operating under benign operating conditions for the TSN 102. As depicted in FIG. 9A, the protocol computations model 702 of the AADT 602 decodes a set of timestamps 914 from the time information 418 contained in messages 112 transported by the TSN 102. The protocol computations model 702 generates a measured offset 728 ($O_m$), which it outputs to the clock servo model 704. The clock servo model 704 generates model clock control information 730 from Om, such as frequency adjustment (f), which it outputs to the time synchronization model 710. The time synchronization model 710 generates an expected offset 732 ($O_{exp}$) from f, and it outputs $O_{exp}$ to the attack extractor 720 of the model recovery manager 708.

The attack extractor 720 measures an attack amplitude ($O_{attk}$) of a time desynchronization attack. Once the attack extractor 720 quantifies and extracts the time offset introduced by the attacker 514, the sample sanitizer 722 is used to eliminate the effects of the attack samples from the input. As an additional feature, the sample sanitizer 722 flushes any effects of the attack from the AADT 602 as well, thereby allowing the AADT 602 to continue to operate in replacement of the clock manager 422 for more than one synchronization cycle. When there is no active attacker 514 in the network, the $O_m$ produces a correct f, which in turn produces an expected offset 732. In the benign case (no attacker), $O_{exp}$ will closely match the $O_m$.

Figure 9B:
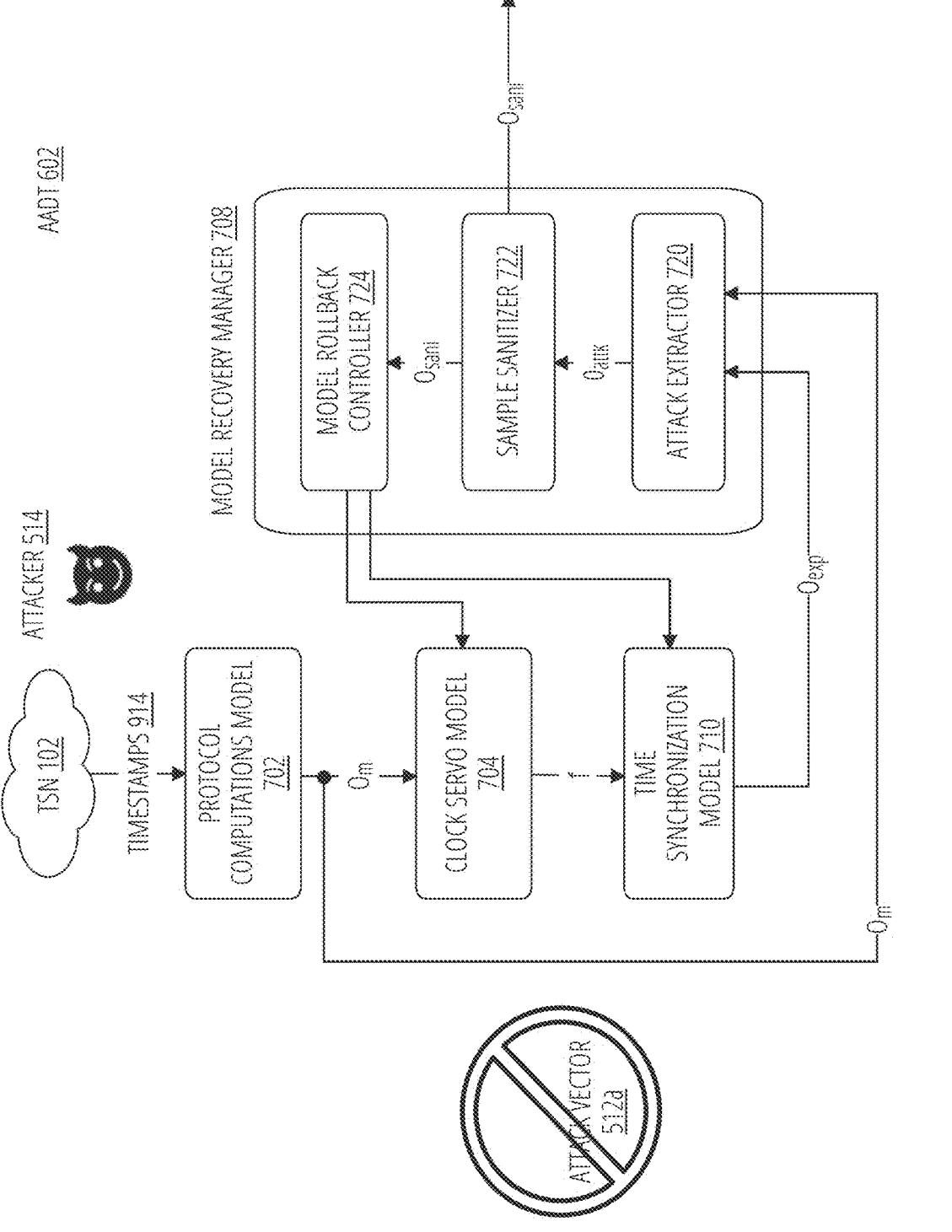
FIG. 9B illustrates an AADT 602 in accordance with one embodiment.

FIG. 9B illustrates a more detailed diagram for the AADT 602 operating under initial attack operating conditions for the TSN 102. As depicted in FIG. 9B, assume a network attacker 514 maliciously changes the network timestamps that are necessary to maintain time synchronization with the CL. These malicious samples when consumed by the time synchronization model 710 produces an incorrect $O_{exp}$. The difference between the expected versus measured time offset is used to calculate the amplitude of the attack ($O_{attk}$) which is then removed from the current sample resulting in a sanitized clock control information 736 ($O_{sani}$). In other words, this is the time offset that should be applied to the system if there was no attacker 514 present. The $O_{sani}$ can then be applied to the clock circuitry 412 to ensure no attack influence reaches the system.

Figure 9C:
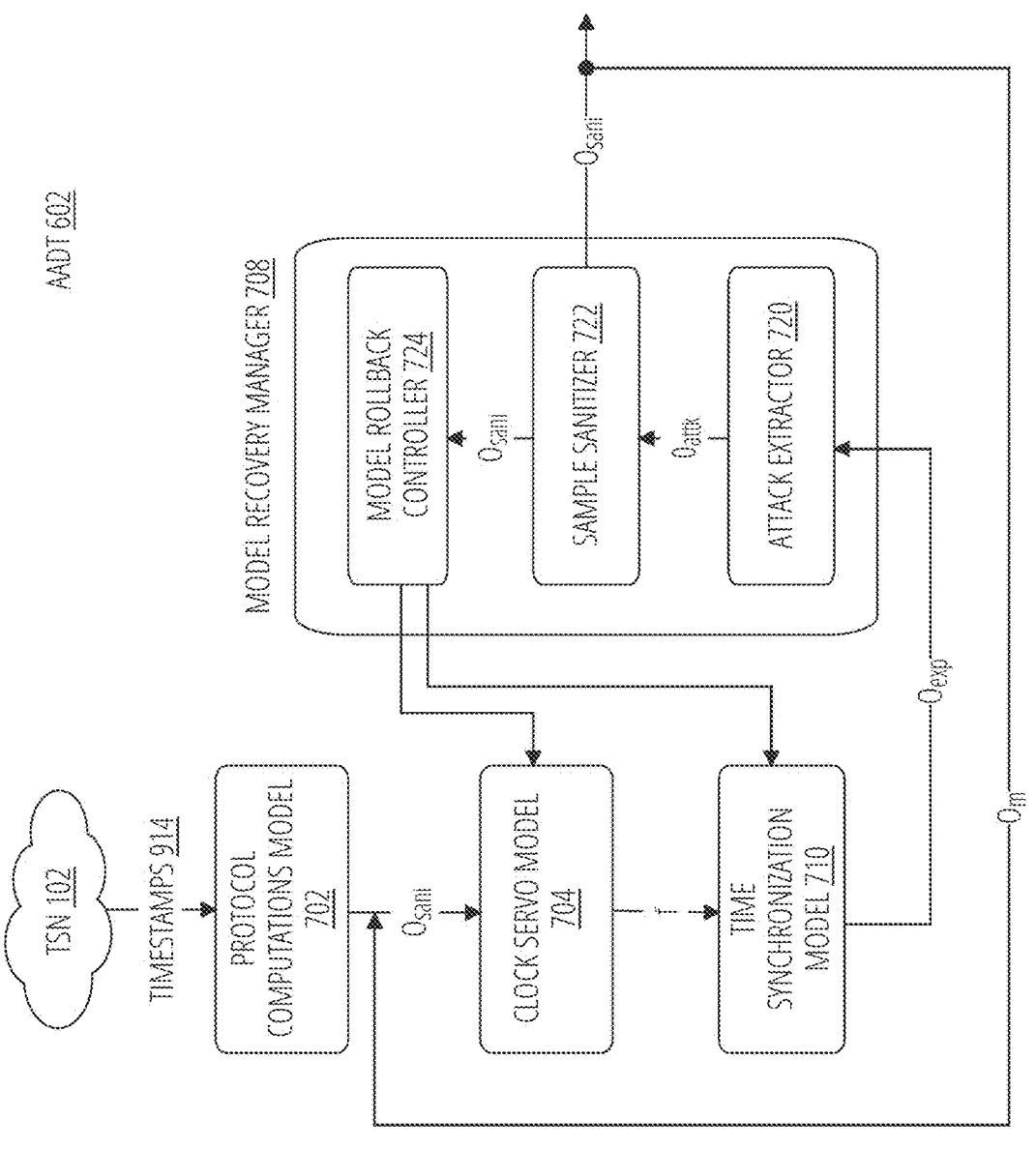
FIG. 9C illustrates an AADT 602 in accordance with one embodiment.

FIG. 9C illustrates a more detailed diagram for the AADT 602 operating under continuous or persistent attack operating conditions for the TSN 102. Consuming the attack samples into the AADT 602 is necessary to produce $O_{sani}$ during a given synchronization cycle. However, the model recovery manager 708 also needs to correct state changes that have occurred within the AADT 602 due to the influence of the attack to have sustained prevention for future synchronization cycles. To accomplish this function, the model rollback controller 724 performs two main functions. First, the model rollback controller 724 rolls back the clock servo model 704 and the time synchronization model 710 of the clock manager model 740 to remove malicious samples from the state information 744 of the clock manager model 740. Second, the model rollback controller 724 rolls forward the clock servo model 704 and the time synchronization model 710 of the clock manager model 740 using the sanitized clock control information 736 ($O_{sani}$), since $O_{sani}$ represents a correct time offset that should be applied to the system without the influence of the attacker 514. The model rollback controller 724 performs these operations for every synchronization cycle. In this manner, the model rollback controller 724 can continue to correct for the influence of the attacker 514 for future synchronization cycles until the attacker 514 is mitigated.

FIG. 10 illustrates a system 1000. The system 1000 is an example of a TSN node 104 implementing all the features of the apparatus 400, the apparatus 600, the apparatus 800, and the apparatus 916. In addition, the system 1000 further includes a hardened execution environment 1002, processing circuitry 1004, and a processing circuitry 1006. The system 1000 may further include other components, such as an application execution environment and a set of clock manager (CM) API applications (not shown).

The system 1000 illustrates a hardened execution environment 1002 coupled to the clock circuitry 412 via the clock control gate 604. The hardened execution environment 1002 may be hardware-based or software-based with suitable hardware features and/or support. In various embodiments, the hardened execution environment 1002 may be implemented, for example, as a trusted platform module (TPM), a trusted computing base (TCB), a trusted execution environment (TEE), hypervisor-based environments, virtual machine environments, software guard extensions (SGX) made by Intel® Corporation, an Intel trusted execution technology (TXT), an Intel technology enabling platform (TEP), or other secure execution environment. A secure execution environment is a system of hardware, software and firmware to execute secure and trusted processes and store confidential information. The hardened execution environment 1002 may comprise, among other components, processing circuitry 1004 to execute the AADT 602. The AADT 602 is ready to take over operations for the clock manager 422 in response to an alert 746 from the IDS 726 received by the detector 738. The AADT 602 can use a clock manager model 740 that is the same or similar to the clock servo 608 used by the clock manager 422. Other clock servo models different from the clock manager model 740 may also be implemented for the AADT 602 as well. Embodiments are not limited in this context.

As depicted in FIG. 10, the hardened execution environment 1002 comprises the processing circuitry 1004 to execute instructions for the AADT 602. The hardened execution environment 1002 may comprise, for example, a trusted platform module (TPM) hardware platform, a TCB hardware platform, or some other security platform that implements a separate and protected execution environment for hardware, software and firmware. In one embodiment, for example, the hardened execution environment 1002 can be implemented as a TPM. A TPM is a physical or embedded security technology (microcontroller) that resides on a computer's motherboard or in its processor. TPMs use cryptography to help securely store essential and critical information on a computer to enable platform authentication. They store a variety of sensitive information—such as user credentials, passwords, fingerprints, certificates, encryption keys, or other important consumer documentation—behind a hardware barrier to keep it safe from external attacks. A TPM can also comprise a security chip that executes software and firmware in a secure and protected manner.

The system 1000 further includes processing circuitry 1006. The processing circuitry 1006 may execute instructions for the clock manager 422. In one embodiment, the processing circuitry 1006 is isolated from the processing circuitry 1004. In this way, an attack directly on the clock manager 422 is contained to the processing threads and address space allocated to the clock manager 422, and it cannot affect operations for the AADT 602 executing on the processing circuitry 1004 of the hardened execution environment 1002.

By way of example, the system 1000 includes memory (e.g., the memory 416) to store instructions. The system 1000 also includes first processing circuitry 1004 coupled to the memory, the first processing circuitry 1004 to execute the instructions to perform operations for an AADT 602. The AADT 602 simulates operations of a clock manager 422 for a TSN node 104 in a TSN 102 based on one or more physics-aware models. The AADT 602 comprises a clock manager model 740 to receive time information 418 for the TSN 102 and generate model clock control information 730 to adjust a clock circuitry 412 to a network time for the TSN 102. In some cases, the model clock control information 730 contains a malicious time sample introduced by a time desynchronization attack in the TSN 102. A model recovery manager 708 of the AADT 602 removes the malicious time sample from the model clock control information 730 to generate sanitized clock control information 736 to adjust the clock circuitry 412 to the network time for the TSN 102.

The system 1000 includes a second processing circuitry 1006 to execute instructions to perform operations for the clock manager 422. The clock manager 422 receives the time information 418 for the TSN 102 and it generates clock control information 420 to adjust the clock circuitry 412 to a network time for the TSN 102.

The clock manager model 740 of the AADT 602 further includes a protocol computations model 702 to generate a measured offset 610 from the time information 418. The clock servo model 704 of the AADT 602 generates model clock control information 730 to adjust a clock circuitry 412 to a network time for the TSN 102 based on the measured offset 728. The time synchronization model 710 of the AADT 602 generates an expected offset 732 value for the clock circuitry 412 based on the model clock control information 730. The time synchronization model 710 simulates the clock circuitry 412 to manage the clock.

The model recovery manager 708 includes an attack extractor 720. The attack extractor 720 receives a first expected offset 732 value for the clock circuitry 412 based on the model clock control information 730 for a current synchronization cycle. The attack extractor 720 retrieves a second expected offset 732 value for the clock circuitry 412 based on model clock control information 730 stored for a previous synchronization cycle. The attack extractor 720 determines a difference value between the first expected offset value and the second expected offset value, and it calculates an attack amplitude ($O_{attk}$) based on the difference value. The attack amplitude represents an amount of time offset caused by the time desynchronization attack.

The model recovery manager 708 includes a sample sanitizer 722. The sample sanitizer 722 identifies the malicious time sample in the model clock control information 730 based on the attack amplitude, and it removes the malicious time sample from the model clock control information 730 to produce the sanitized clock control information 736.

The model recovery manager 708 includes a model rollback controller 724. The model rollback controller 724 rolls back state information 744 for the clock manager model 740 to remove the malicious time sample, and it rolls forward state information 744 for the clock manager model 740 based on the sanitized clock control information 736.

The system 1000 also includes clock circuitry 412 to manage a clock for the TSN node 104 in the TSN 102. The system 1000 further includes a clock control gate 604 coupled to the clock circuitry 412, the first processing circuitry 1004, and the second processing circuitry 1006. The clock control gate 604 controls access to the clock of the clock circuitry 412.

The AADT 602 further comprises a detector 738 to determine the TSN 102 is operating under attack conditions when an alert 746 message is received from an IDS 726. The gate control logic 614 of the detector 738 sends a configuration signal 742 to the clock control gate 604 to configure the clock control gate 604 to pass the sanitized clock control information 736 from the AADT 602 to the clock circuitry 412 to adjust the clock to the network time for the TSN 102.

As a default setting, the detector 738 may determine the TSN 102 is operating under benign conditions. In this case, the gate control logic 614 of the detector 738 sends a configuration signal 742 to the clock control gate 604 to configure the clock control gate 604 to pass the clock control information 420 from the clock manager 422 to the clock circuitry 412 to adjust the clock circuitry 412 to the network time for the TSN 102.

Figure 11:
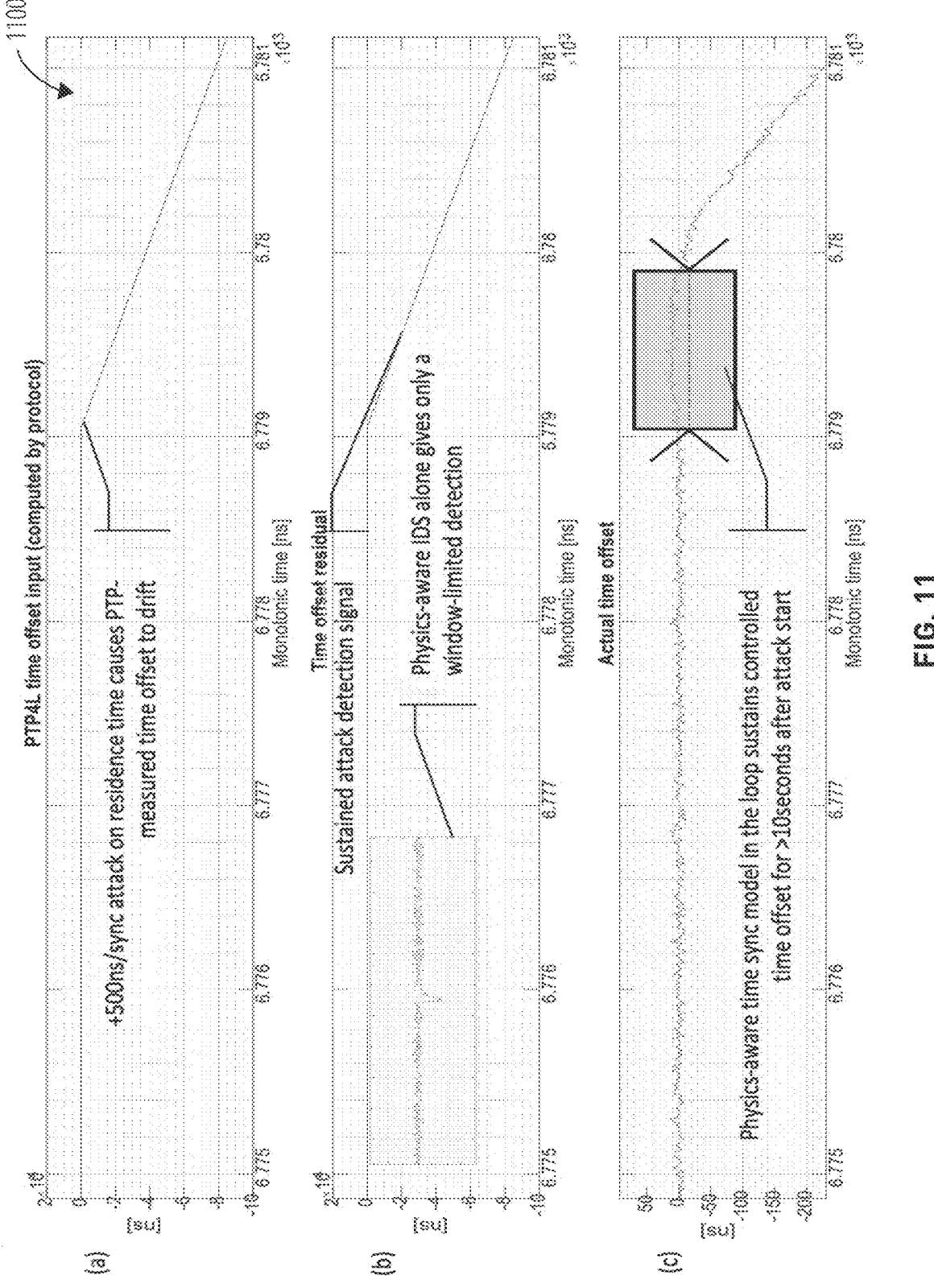
FIG. 11 illustrates an aspect a set of graphs 1100 in accordance with one embodiment.

FIG. 11 illustrates a set of graphs 1100 that provides an example of a residual signal. The graphs 1100 illustrates experimental results for the effectiveness of the AADT 602.

In a first graph 1100(*a*), results are shown in an experiment where a clock manager 422 of a TSN node 104 of a TSN 102 is subject to a time desynchronization attack where an attacker 514 launches a 500 nanosecond (ns) bias attack on the network. Every synchronization cycle the attacker 514 is biasing the CF by 500 ns. The 500 ns per synchronization cycle attack on residence time causes the PTP-measured time offset to drift. Between approximately 6.779 ns to 6.781 ns, the graph illustrates the measured offset 610 to drift from 0 ns to −8 ns.

In a second graph 1100(*b*), the $O_{attk}$ is depicted as the time offset residual and it demonstrates extraction of the malicious samples. Note that in the state-of-the-art detection schemes, using a physics-aware IDS 726, the attack detection signal gives a limited detection window, and the attack detection signal is lost as the system consumes the malicious samples.

However, with AADT 602 we can perform sustained detection as the AADT 602 is designed to eliminate the attacker influence before consumption. A third graph 1100 (*c*) shows the $O_{sani}$, also depicted as the actual time offset applied to the system, which is able to maintain time synchronization even in the presence of an active attacker 514. As any process dependent on physical processes of the TSN 102 is also subject to changes to the environment and can diverge when the attack is present for a long period of time. This experiment shows that a physics-aware time synchronization model 710 in the loop sustains controlled time offset for continued time synchronization for over 10 seconds after the start of the attack. The TSN 102 typically works in a dimension of nanoseconds and therefore 10 seconds provides a fairly large operational window to continue clock manager operations while the attack is contained and mitigated.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

FIG. 12 illustrates an embodiment of a logic flow 1200. The logic flow 1200 may be representative of some or all of the operations executed by one or more embodiments described herein. For example, the logic flow 1200 may include some or all of the operations performed by devices or entities within the TSN 102, such as the apparatus 400, apparatus 600, apparatus 800*a*, apparatus 800*b*, apparatus 916, and/or system 1000. More particularly, the logic flow 1200 illustrates a use case where the AADT 602 operates to synthesize model clock control information 730 and sanitize the model clock control information 730 to remove any malicious time samples to generate sanitized clock control information 736. Embodiments are not limited in this context.

In block 1202, logic flow 1200 receives time information for a network by an attack-aware digital twin (AADT), the AADT to simulate operations of a clock manager for a node in the network based on physics-aware models. In block 1204, logic flow 1200 generates model clock control information to adjust a clock to a network time for the network, the model clock control information to contain a malicious time sample introduced by a time desynchronization attack in the network. In block 1206, logic flow 1200 removes the malicious time sample from the model clock control information. In block 1208, logic flow 1200 generating sanitized clock control information to adjust the clock to the network time for the network.

By way of example, with reference to the apparatus 800*a* and apparatus 800*b*, the AADT 602 receives time information 418 for a TSN 102, where the AADT 602 is designed to simulate operations of a clock manager 422 for a TSN node 104 in the TSN 102 based on physics-aware models. The AADT 602 generates model clock control information 730 to adjust clock circuitry 412 to a network time for the TSN 102. Under attack conditions, the model clock control information 730 may contain a malicious time sample introduced by a time desynchronization attack in the TSN 102. A model recovery manager 708 for the AADT 602 is designed to remove the malicious time sample from the model clock control information 730, and it generates sanitized clock control information 736 to adjust the clock circuitry 412 to the network time for the TSN 102.

To generate the sanitized clock control information 736, the protocol computations model 702 of the AADT 602 generates a measured offset 728 value from the time information 418. The clock servo model 704 generates model clock control information 730 to adjust a hardware clock circuitry 412 to a network time for the TSN 102 based on the measured offset 728 value. The time synchronization model 710 generates an expected offset 732 value for the hardware clock circuitry 412 based on the model clock control information 730. The time synchronization model 710 simulates clock circuitry 412 to manage the clock.

To perform model recovery operations, the attack extractor 720 of the model recovery manager 708 for the AADT 602 receives a first expected offset 732 value for the hardware clock circuitry 412 based on the model clock control information 730 for a current synchronization cycle. The attack extractor 720 retrieves a second expected offset 732 value for the clock circuitry 412 based on model clock control information 730 stored for a previous synchronization cycle. The attack extractor 720 determines a difference value between the first expected offset value and the second expected offset value. The attack extractor 720 calculates an attack amplitude ($O_{attk}$) based on the difference value. The attack amplitude represents an amount of time offset caused by the time desynchronization attack.

The sample sanitizer 722 of the AADT 602 identifies the malicious time sample in the model clock control information 730 based on an attack amplitude. The sample sanitizer 722 removes the malicious time sample from the model clock control information 730 to produce the sanitized clock control information 736.

The model rollback controller 724 of the AADT 602 rolls back state information 744 for the clock manager model 740 to remove the malicious time sample. The model rollback controller 724 also rolls forward state information 744 for the clock manager model 740 based on the sanitized clock control information 736.

FIG. 13 illustrates an embodiment of a logic flow 1300. The logic flow 1300 may be representative of some or all of the operations executed by one or more embodiments described herein. For example, the logic flow 1300 may include some or all of the operations performed by devices or entities within the TSN 102, such as the apparatus 400, apparatus 600, apparatus 800a, apparatus 800b, apparatus 916, and/or system 1000. More particularly, the logic flow 1300 illustrates a use case where the AADT 602 operates to determine when to use the sanitized clock control information 736. Embodiments are not limited in this context.

In block 1302, logic flow 1300 receives time information for a network by an attack-aware digital twin (AADT), the AADT to simulate operations of a clock manager for a node in the network based on physics-aware models. In block 1304, logic flow 1300 generates model clock control information to adjust a clock to a network time for the network, the model clock control information to contain a malicious time sample introduced by a time desynchronization attack in the network. In block 1306, logic flow 1300 removes the malicious time sample from the model clock control information. In block 1308, logic flow 1300 generating sanitized clock control information to adjust the clock to the network time for the network. In block 1310, logic flow 1300 receives the time information for the network by the clock manager. In block 1312, logic flow 1300 generates clock control information to adjust the clock to a network time for the network. In block 1314, logic flow 1300 controls access to a hardware clock by a clock control gate in response to gate control logic. In block 1316, logic flow 1300 determines the network is operating under attack conditions when an alert message is received from an intrusion detection system (IDS). In block 1318, logic flow 1300 sends a configuration signal to the clock control gate to configure the clock control gate to pass the sanitized clock control information from the AADT to the hardware clock to adjust the hardware clock to the network time for the network.

By way of example, with reference to the apparatus 800a and apparatus 800b, the AADT 602 receives time information 418 for a TSN 102, where the AADT 602 is designed to simulate operations of a clock manager 422 for a TSN node 104 in the TSN 102 based on physics-aware models. The AADT 602 generates model clock control information 730 to adjust clock circuitry 412 to a network time for the TSN 102. Under attack conditions, the model clock control information 730 may contain a malicious time sample introduced by a time desynchronization attack in the TSN 102. A model recovery manager 708 for the AADT 602 is designed to remove the malicious time sample from the model clock control information 730, and it generates sanitized clock control information 736 to adjust the clock circuitry 412 to the network time for the TSN 102.

At approximately the same time, the clock manager 422 receives the time information 418 for the TSN 102, and it generates clock control information 420 to adjust the clock circuitry 412 to a network time for the TSN 102.

The clock control gate 604 receives both the clock control information 420 from the clock manager 422 and the sanitized clock control information 736 from the AADT 602. The clock control gate 604 controls access to a hardware clock circuitry 412 in response to configuration signals 742 from the gate control logic 614.

The detector 738 of the AADT 602 determines the TSN 102 is operating under attack conditions when an alert 746 message is received from the IDS 726. The gate control logic 614 of the detector 738 sends a configuration signal 742 to the clock control gate 604 to configure the clock control gate 604 to pass the sanitized clock control information 736 from the AADT 602 to the hardware clock circuitry 412 to adjust the hardware clock circuitry 412 to the network time for the TSN 102.

FIG. 14 illustrates an embodiment of a logic flow 1400. The logic flow 1400 may be representative of some or all of the operations executed by one or more embodiments described herein. For example, the logic flow 1400 may include some or all of the operations performed by devices or entities within the TSN 102, such as the apparatus 400, apparatus 600, apparatus 800a, apparatus 800b, apparatus 916, and/or system 1000. More particularly, the logic flow 1400 illustrates a use case where the AADT 602 operates to determine when to use the sanitized clock control information 736. Embodiments are not limited in this context.

In block 1402, logic flow 1400 receives time information for a network by an attack-aware digital twin (AADT), the AADT to simulate operations of a clock manager for a node in the network based on physics-aware models. In block 1404, logic flow 1400 generates model clock control information to adjust a clock to a network time for the network, the model clock control information to contain a malicious time sample introduced by a time desynchronization attack in the network. In block 1406, logic flow 1400 removes the malicious time sample from the model clock control information. In block 1408, logic flow 1400 generating sanitized clock control information to adjust the clock to the network time for the network. In block 1410, logic flow 1400 receives the time information for the network by the clock manager. In block 1412, logic flow 1400 generates clock control information to adjust the clock to a network time for the network. In block 1414, logic flow 1400 controls access to a hardware clock by a clock control gate in response to gate control logic. In block 1416, logic flow 1400 determines the network is operating under benign conditions. In block 1418, logic flow 1400 sends a configuration signal to the clock control gate to configure the clock control gate to pass the clock control information from the clock manager to the hardware clock to adjust the hardware clock to the network time for the network.

By way of example, with reference to the apparatus 800a and apparatus 800b, the AADT 602 receives time information 418 for a TSN 102, where the AADT 602 is designed to simulate operations of a clock manager 422 for a TSN node 104 in the TSN 102 based on physics-aware models. The AADT 602 generates model clock control information 730 to adjust clock circuitry 412 to a network time for the TSN 102. Under attack conditions, the model clock control information 730 may contain a malicious time sample introduced by a time desynchronization attack in the TSN 102. A model recovery manager 708 for the AADT 602 is designed to remove the malicious time sample from the model clock control information 730, and it generates sanitized clock control information 736 to adjust the clock circuitry 412 to the network time for the TSN 102.

At approximately the same time, the clock manager 422 receives the time information 418 for the TSN 102, and it generates clock control information 420 to adjust the clock circuitry 412 to a network time for the TSN 102.

The clock control gate 604 receives both the clock control information 420 from the clock manager 422 and the sanitized clock control information 736 from the AADT 602. The clock control gate 604 controls access to a hardware clock circuitry 412 in response to configuration signals 742 from the gate control logic 614.

The detector 738 determines the TSN 102 is operating under benign conditions. For example, the detector 738 may not receive an alert 746 from the IDS 726 for a defined period of time or have a default setting for benign conditions. The gate control logic 614 sends a configuration signal 742 to the clock control gate 604 to configure the clock control gate 604 to pass the clock control information 420 from the clock manager 422 to the hardware clock circuitry 412 to adjust the hardware clock circuitry 412 to the network time for the TSN 102.

Figures 15A, 15B:
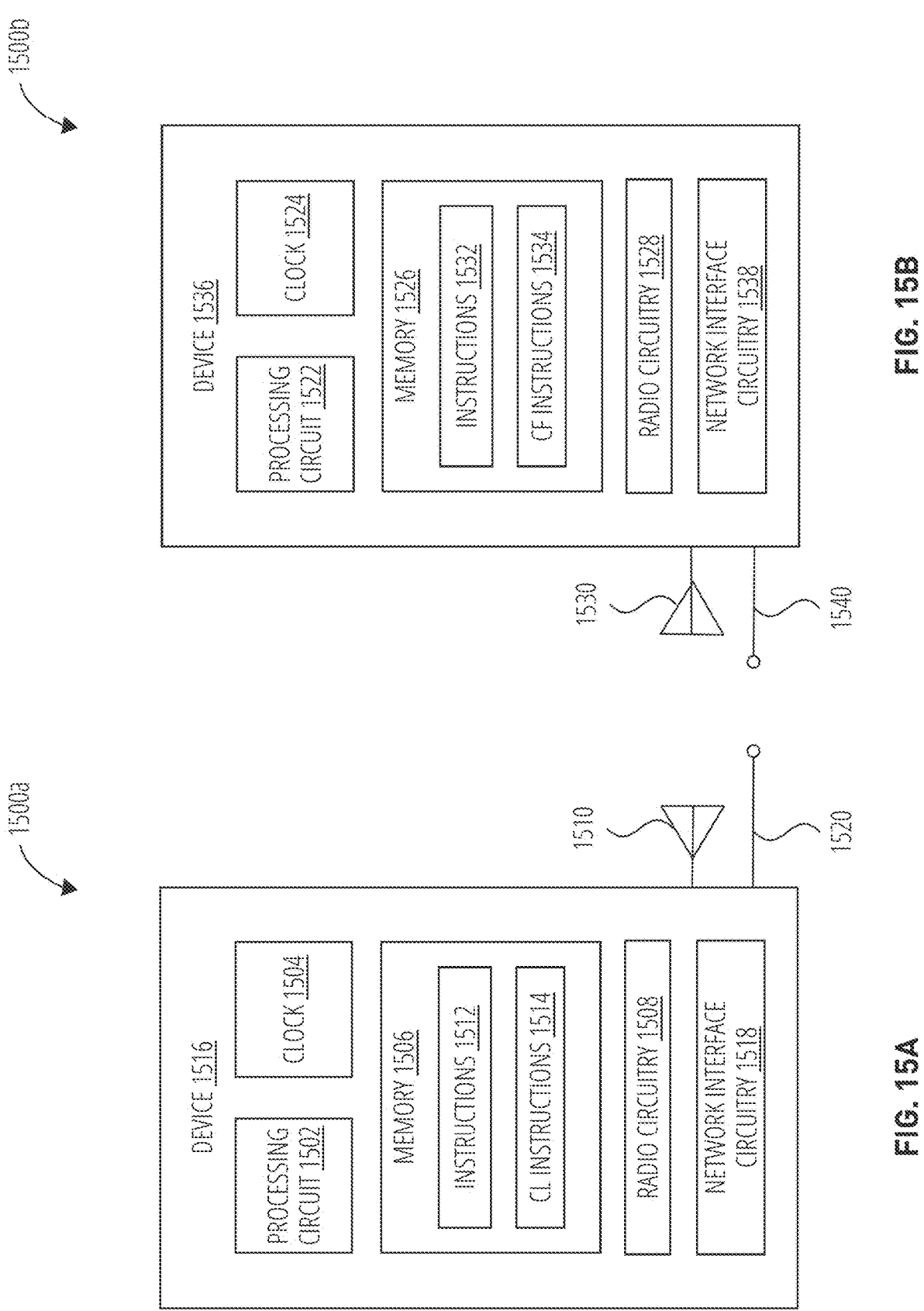
FIG. 15A illustrates an aspect of a clock leader (CL) 1500a in accordance with one embodiment.
FIG. 15B illustrates an aspect of a clock follower (CF) 1500b in accordance with one embodiment.

FIG. 15A depicts a device 1516. The device 1516 could be a network node or one of the switches in a TSN network (e.g., TSN nodes 104, talker node 202, relay nodes 204a-c, listener node 206, relay node 302, etc.). Device 1516 includes a processing circuit 1502, a clock 1504, memory 1506, radio circuitry 1508, an antenna 1510, a network interface circuitry 1518, and a wired connection 1520. Memory 1506 stores instructions 1512 and CL instructions 1514. During operation, processing circuit 1502 can execute instructions 1512 and/or CL instructions 1514 to cause device 1516 to send timing messages as a clock leader or grand clock leader (e.g., from time measurements from a global clock for a TSN network) to other devices in the TSN network. In some examples, processing circuit 1502 can execute instructions 1512 and/or CL instructions 1514 to cause device 1516 to send time synchronization messages, time update messages, and other timing messages defined by various IEEE standards as discussed herein. Furthermore, processing circuit 1502 can execute instructions 1512 to cause device 1516 to send, via radio circuitry 1508 and antenna 1510 or network interface circuitry 1518 timing messages as the CL for a CF in a TSN network.

FIG. 15B depicts a device 1536. The device 1536 could be one of the network nodes or switches in a TSN network (e.g., TSN nodes 104, talker node 202, relay nodes 204a-c, listener node 206, relay node 302, etc.). Device 1536 includes a processing circuit 1522, a clock 1524, memory 1526, radio circuitry 1528, an antenna 1530, a network interface circuitry 1538, and a wired connection 1540. Memory 1526 stores instructions 1532 and CF instructions 1534. During operation, processing circuit 1522 can execute instructions 1532 and/or CF instructions 1534 to cause device 1536 to receive timing messages as a clock follower (e.g., from time measurements from a global clock for a TSN network) from other devices in the TSN network, such as the device 1516. In some examples, processing circuit 1522 can execute instructions 1532 and/or CF instructions 1534 to cause device 1536 to receive time synchronization messages, time update messages, and other timing messages defined by various IEEE standards as discussed herein. Furthermore, processing circuit 1522 can execute instructions 1532 and/or CF instructions 1534 to cause device 1536 to receive, via radio circuitry 1528 and antenna 1530 or network interface circuitry 1538 timing messages as the CF for a CL in a TSN network. In addition, processing circuit 1522 can execute instructions 1532 and/or CF instructions 1534 to cause device 1536 to send, via radio circuitry 1528 and antenna 1530 or network interface circuitry 1538 security messages in response to a security attack, such as alert messages, notification messages, network reconfiguration messages, device isolation messages, model update messages, and other messages in a TSN network.

Figure 16:
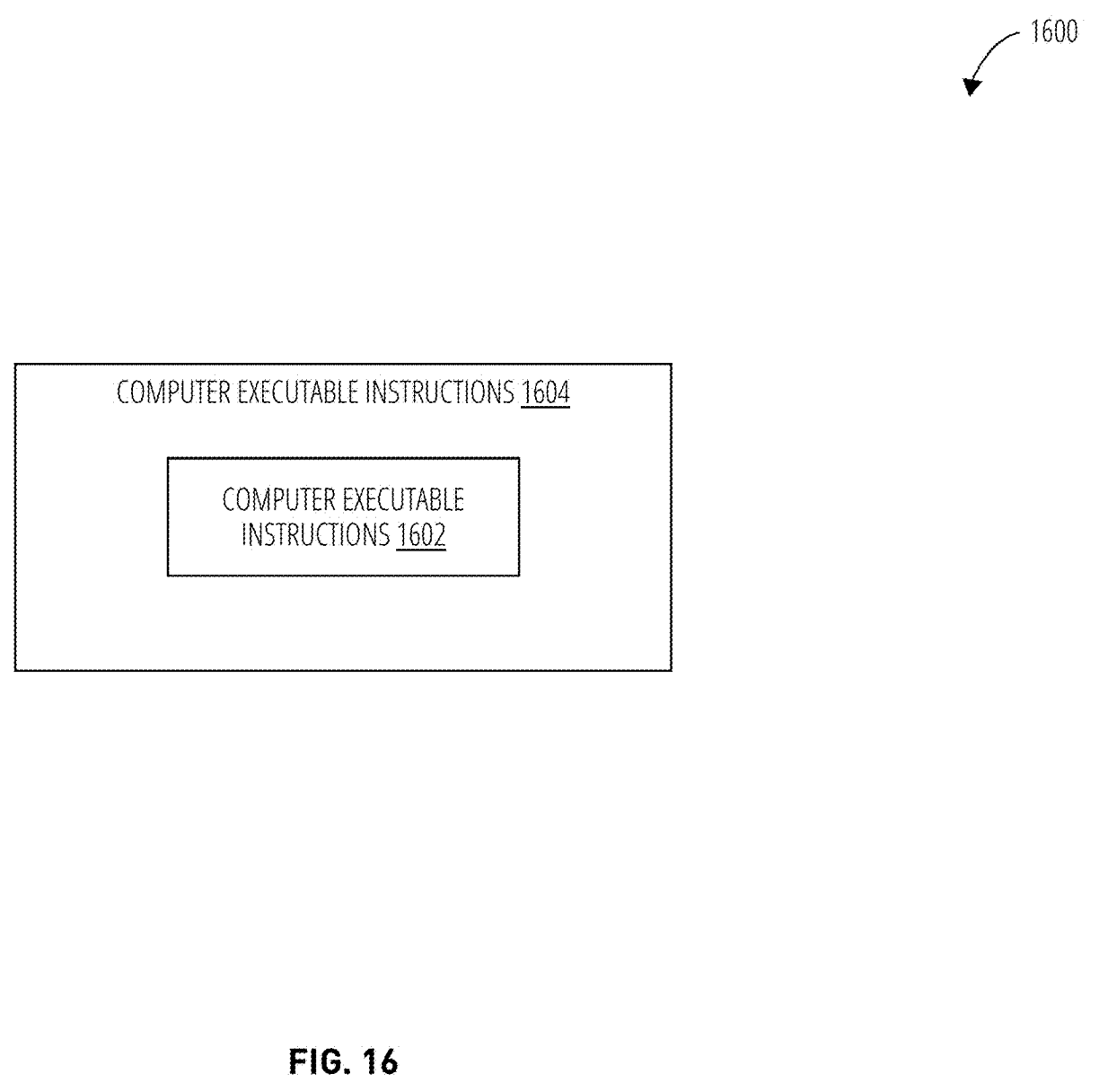

FIG. 16 illustrates computer-readable storage computer-readable medium 1600. Computer-readable storage computer-readable medium 1600 may comprise any non-transitory computer-readable storage medium or machine-readable storage medium, such as an optical, magnetic or semiconductor storage medium. In various embodiments, computer-readable storage computer-readable medium 1600 may comprise an article of manufacture. In some embodiments, computer-readable storage computer-readable medium 1600 may store computer executable instructions 1402 with which circuitry (e.g., processing circuitry 414, processing circuit 1502, processing circuit 1522, radio circuitry 1508, radio circuitry 1528, network interface circuitry 1518, network interface circuitry 1538, clock manager 106, clock circuitry 412, or the like) can execute. For example, computer executable instructions 1602 can include instructions to implement operations described with respect to logic flows 1900 and 2000. Examples of computer-readable storage computer-readable medium 1600 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 1602 may include any suitable type of code, such as source code, compiled code, interpreted code, executable code, static code, dynamic code, object-oriented code, visual code, and the like.

The various elements of the devices as previously described with reference to the figures include various hardware elements, software elements, or a combination of both. Examples of hardware elements include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements varies in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment are implemented by representative instructions stored on a machine-readable medium which represents various logic within the processor, which when read by a machine causes the machine to fabricate logic to perform the techniques described herein. Such representations, known as "intellectual property (IP) cores" are stored on a tangible, machine readable medium and supplied to various customers or manufacturing facilities to load into the fabrication machines that make the logic or processor. Some embodiments are implemented, for example, using a machine-readable medium or article which may store an instruction or a set of instructions that, when executed by a machine, causes the machine to perform a method and/or operations in accordance with the embodiments. Such a machine includes, for example, any suitable processing platform, computing platform, computing device, processing device, computing system, processing system, processing devices, computer, processor, or the like, and is implemented using any suitable combination of hardware and/or software. The machine-readable medium or article includes, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions include any suitable type of code, such as source code, compiled code, interpreted code, executable code, static code, dynamic code, encrypted code, and the like, implemented using any suitable high-level, low-level, object-oriented, visual, compiled and/or interpreted programming language.

As utilized herein, terms "component," "system," "interface," and the like are intended to refer to a computer-related entity, hardware, software (e.g., in execution), and/or firmware. For example, a component is a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server is also a component. One or more components reside within a process, and a component is localized on one computer and/or distributed between two or more computers. A set of elements or a set of other components are described herein, in which the term "set" can be interpreted as "one or more."

Further, these components execute from various computer readable storage media having various data structures stored thereon such as with a module, for example. The components communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component is an apparatus with specific functionality provided by mechanical parts operated by electric or electronic circuitry, in which the electric or electronic circuitry is operated by a software application or a firmware application executed by one or more processors. The one or more processors are internal or external to the apparatus and execute at least a part of the software or firmware application. As yet another example, a component is an apparatus that provides specific functionality through electronic components without mechanical parts; the electronic components include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry is implemented in, or functions associated with the circuitry are implemented by, one or more software or firmware modules. In some embodiments, circuitry includes logic, at least partially operable in hardware. It is noted that hardware, firmware and/or software elements may be collectively or individually referred to herein as "logic" or "circuit."

Some embodiments are described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately can be employed in combination with each other unless it is noted that the features are incompatible with each other.

Some embodiments are presented in terms of program procedures executed on a computer or network of computers. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments are described using the expression "coupled" and "connected" along with their derivatives. These terms are not necessarily intended as synonyms for each other. For example, some embodiments are described using the terms "connected" and/or "coupled" to indicate that two or more elements are in direct physical or electrical contact with each other. The term "coupled," however, also means that two or more elements are not in direct contact with each other, but yet still co-operate or interact with each other.

Various embodiments also relate to apparatus or systems for performing these operations. This apparatus is specially constructed for the required purpose or it comprises a general purpose computer as selectively activated or reconfigured by a computer program stored in the computer. The procedures presented herein are not inherently related to a particular computer or other apparatus. Various general purpose machines are used with programs written in accordance with the teachings herein, or it proves convenient to construct more specialized apparatus to perform the required method steps. The required structure for a variety of these machines are apparent from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The following aspects and examples pertain to further embodiments, from which numerous permutations and configurations will be apparent.

In one independent example, an apparatus, includes memory to store instructions. The apparatus also includes first processing circuitry coupled to the memory, the first processing circuitry to execute the instructions to perform operations for an attack-aware digital twin (AADT), the AADT to simulate operations of a clock manager for a node in a network based on physics-aware models, the AADT to comprise a clock manager model to receive time information for a network and generate model clock control information to adjust a clock to a network time for the network, the model clock control information to contain a malicious time sample introduced by a time desynchronization attack in the network, and a model recovery manager to remove the malicious time sample from the model clock control information to generate sanitized clock control information to adjust the clock to the network time for the network.

The independent example may further include any one of the following dependent examples or any combination of the following dependent examples. For example, further to the independent example, the apparatus may also have a configuration or further includes a second processing circuitry to execute instructions to perform operations for the clock manager, the clock manager to receive the time information for the network and generate clock control information to adjust the clock to a network time for the network.

The apparatus may also have a configuration or further the clock manager model includes a protocol computations model to generate a measured offset from the time information, a clock servo model to generate model clock control information to adjust a clock to a network time for the network based on the measured time offset value, and a time synchronization model to generate an expected offset value for the clock based on the model clock control information, the time synchronization model to simulate clock circuitry to manage the clock.

The apparatus may also have a configuration or further the model recovery manager includes an attack extractor, the attack extractor to receive a first expected offset value for the clock based on the model clock control information for a current synchronization cycle, retrieve a second expected offset value for the clock based on model clock control information stored for a previous synchronization cycle, determine a difference value between the first expected offset value and the second expected offset value, and calculate an attack amplitude based on the difference value, the attack amplitude to represent an amount of time offset caused by the time desynchronization attack.

The apparatus may also have a configuration or further the model recovery manager includes a sample sanitizer, the sample sanitizer to identify the malicious time sample in the model clock control information based on an attack amplitude, and remove the malicious time sample from the model clock control information.

The apparatus may also have a configuration or further the model recovery manager includes a model rollback controller, the model rollback controller to roll back state information for the clock manager model to remove the malicious time sample, and roll forward state information for the clock manager model based on the sanitized clock control information. Other technical features may be readily apparent to one skilled in the art from the following figures, descriptions, and claims.

In one independent example, a method, includes receiving time information for a network by an attack-aware digital twin (AADT), the AADT to simulate operations of a clock manager for a node in the network based on physics-aware models, generating model clock control information to adjust a clock to a network time for the network, the model clock control information to contain a malicious time sample introduced by a time desynchronization attack in the network, removing the malicious time sample from the model clock control information, and generating sanitized clock control information to adjust the clock to the network time for the network.

The independent example may further include any one of the following dependent examples or any combination of the following dependent examples. For example, further to the independent example, the method may also have a configuration or further includes receiving the time information for the network by the clock manager, and generating clock control information to adjust the clock to a network time for the network.

The method may also have a configuration or further includes generating a measured offset value from the time information using a protocol computations model of a clock manager model for the AADT, generating model clock control information to adjust a hardware clock to a network time for the network based on the measured time offset value using a clock servo model of the clock manager model for the AADT, and generating an expected offset value for the hardware clock based on the model clock control information using a time synchronization model for the clock manager model of the AADT, the time synchronization model to simulate clock circuitry to manage the clock.

The method may also have a configuration or further includes receiving a first expected offset value for the clock based on the model clock control information for a current synchronization cycle by an attack extractor for a model recovery model of the AADT, retrieving a second expected offset value for the clock based on model clock control information stored for a previous synchronization cycle by the attack extractor, determining a difference value between the first expected offset value and the second expected offset value by the attack extractor, and calculating an attack amplitude based on the difference value by the attack extractor, the attack amplitude to represent an amount of time offset caused by the time desynchronization attack.

The method may also have a configuration or further includes identify the malicious time sample in the model clock control information based on an attack amplitude by a sample sanitizer for a model recovery model of the AADT, and remove the malicious time sample from the model clock control information by the sample sanitizer.

The method may also have a configuration or further includes roll back state information for the clock manager model to remove the malicious time sample by a model rollback controller for a model recovery model of the AADT, and roll forward state information for the clock manager model based on the sanitized clock control information by the model rollback controller. Other technical features may be readily apparent to one skilled in the art from the following figures, descriptions, and claims.

In one independent example, a non-transitory computer-readable storage medium, the computer-readable storage medium including instructions that when executed by processing circuitry, cause the processing circuitry to receive time information for a network by an attack-aware digital twin (AADT), the AADT to simulate operations of a clock manager for a node in the network based on physics-aware models, generate model clock control information to adjust a clock to a network time for the network, the model clock control information to contain a malicious time sample introduced by a time desynchronization attack in the network, remove the malicious time sample from the model clock control information, and generate sanitized clock control information to adjust the clock to the network time for the network.

The independent example may further include any one of the following dependent examples or any combination of the following dependent examples. For example, further to the independent example, the computer-readable storage medium may also have a configuration or further includes instructions that when executed by the processing circuitry cause the processing circuitry to receive the time information for the network by the clock manager, and generate clock control information to adjust the clock to a network time for the network.

The computer-readable storage medium may also have a configuration or further includes instructions that when executed by the processing circuitry cause the processing circuitry to generate a measured offset value from the time information using a protocol computations model of a clock manager model for the AADT, generate model clock control information to adjust a hardware clock to a network time for the network based on the measured time offset value using a clock servo model of the clock manager model for the AADT, and generate an expected offset value for the hardware clock based on the model clock control information using a time synchronization model for the clock manager model of the AADT, the time synchronization model to simulate clock circuitry to manage the clock.

The computer-readable storage medium may also have a configuration or further includes instructions that when executed by the processing circuitry cause the processing circuitry to receive a first expected offset value for the clock based on the model clock control information for a current synchronization cycle by an attack extractor for a model recovery model of the AADT, retrieve a second expected offset value for the clock based on model clock control information stored for a previous synchronization cycle by the attack extractor, determine a difference value between the first expected offset value and the second expected offset value by the attack extractor, and calculate an attack amplitude based on the difference value by the attack extractor, the attack amplitude to represent an amount of time offset caused by the time desynchronization attack.

The computer-readable storage medium may also have a configuration or further includes instructions that when executed by the processing circuitry cause the processing circuitry to identify the malicious time sample in the model clock control information based on an attack amplitude by a sample sanitizer for a model recovery model of the AADT, and remove the malicious time sample from the model clock control information by the sample sanitizer.

The computer-readable storage medium may also have a configuration or further includes instructions that when executed by the processing circuitry cause the processing circuitry to roll back state information for the clock manager model to remove the malicious time sample by a model rollback controller for a model recovery model of the AADT, and roll forward state information for the clock manager model based on the sanitized clock control information by the model rollback controller. Other technical features may be readily apparent to one skilled in the art from the following figures, descriptions, and claims.

The independent example may further include any one of the following dependent examples or any combination of the following dependent examples. For example, further to the independent example, the apparatus may also have a configuration or further includes a clock circuitry to manage a clock for the node in the network, and a clock control gate coupled to the clock circuitry, the first processing circuitry, and the second processing circuitry, the clock control gate to control access to the clock of the clock circuitry.

The apparatus may also have a configuration or further the AADT to comprise a detector to determine the network is operating under attack conditions when an alert message is received from an intrusion detection system (IDS), the detector to send a configuration signal to the clock control gate to configure the clock control gate to pass the sanitized clock control information from the AADT to the clock circuitry to adjust the clock to the network time for the network.

The apparatus may also have a configuration or further the AADT to comprise a detector to determine the network is operating under benign conditions, the detector to send a configuration signal to the clock control gate to configure the clock control gate to pass the clock control information from the clock manager to the clock circuitry to adjust the clock to the network time for the network.

The method may also have a configuration or further includes controlling access to a hardware clock by a clock control gate in response to gate control logic.

The method may also have a configuration or further includes determining the network is operating under attack conditions when an alert message is received from an intrusion detection system (IDS), and sending a configuration signal to the clock control gate to configure the clock control gate to pass the sanitized clock control information from the AADT to the hardware clock to adjust the hardware clock to the network time for the network.

The method may also have a configuration or further includes determining the network is operating under benign conditions, and sending a configuration signal to the clock control gate to configure the clock control gate to pass the clock control information from the clock manager to the hardware clock to adjust the hardware clock to the network time for the network.

The computer-readable storage medium may also have a configuration or further includes instructions that when executed by the processing circuitry cause the processing circuitry to control access to a hardware clock by a clock control gate in response to gate control logic.

The computer-readable storage medium may also have a configuration or further includes instructions that when executed by the processing circuitry cause the processing circuitry to determine the network is operating under attack conditions when an alert message is received from an intrusion detection system (IDS), and send a configuration signal to the clock control gate to configure the clock control gate to pass the sanitized clock control information from the AADT to the hardware clock to adjust the hardware clock to the network time for the network.

The computer-readable storage medium may also have a configuration or further includes instructions that when executed by the processing circuitry cause the processing circuitry to determine the network is operating under benign conditions, and send a configuration signal to the clock control gate to configure the clock control gate to pass the clock control information from the clock manager to the hardware clock to adjust the hardware clock to the network time for the network.

What is claimed is:

1. An apparatus, comprising:
memory to store instructions; and
first processing circuitry coupled to the memory, the first processing circuitry to execute the instructions to perform operations for an attack-aware digital twin (AADT), the AADT to simulate operations of a clock manager for a node in a network based on models of the clock manager, the AADT to comprise:
a clock manager model to receive time information for a network and generate model clock control information to adjust a clock to a network time for the network, the model clock control information to contain a malicious time sample introduced by a time desynchronization attack in the network; and
a model recovery manager to use an expected offset value to remove the malicious time sample from the model clock control information to adjust the clock to the network time for the network;
wherein the clock manager model comprises:
a protocol computations model to generate a measured offset from the time information;
a clock servo model to generate model clock control information to adjust the clock to a network time for the network based on the measured time offset value; and
a time synchronization model to generate the expected offset value for the clock based on the model clock control information, the time synchronization model to simulate clock circuitry to manage the clock.

2. The apparatus of claim 1, comprising a second processing circuitry to execute instructions to perform operations for the clock manager, the clock manager to receive the time information for the network and generate clock control information to adjust the clock to a network time for the network.

3. The apparatus of claim 2, comprising:
a clock circuitry to manage the clock for the node in the network; and
a clock control gate coupled to the clock circuitry, the first processing circuitry, and the second processing circuitry, the clock control gate to control access to the clock of the clock circuitry.

4. The apparatus of claim 3, the AADT to comprise a detector to determine the network is operating under attack conditions when an alert message is received from an intrusion detection system (IDS), the detector to send a configuration signal to the clock control gate to configure the clock control gate to pass the model clock control information without the malicious time sample from the AADT to the clock circuitry to adjust the clock to the network time for the network.

5. The apparatus of claim 3, the AADT to comprise a detector to determine the network is operating under benign conditions, the detector to send a configuration signal to the clock control gate to configure the clock control gate to pass the clock control information from the clock manager to the clock circuitry to adjust the clock to the network time for the network.

6. The apparatus of claim 1, the model recovery manager comprising a sample sanitizer, the sample sanitizer to:

identify the malicious time sample in the model clock control information based on an attack amplitude; and remove the malicious time sample from the model clock control information.

7. The apparatus of claim 1, the model recovery manager comprising a model rollback controller, the model rollback controller to:

roll back state information for the clock manager model to remove the malicious time sample; and roll forward state information for the clock manager model based on the model clock control information without the malicious time sample.

8. An apparatus, comprising:

memory to store instructions; and first processing circuitry coupled to the memory, the first processing circuitry to execute the instructions to perform operations for an attack-aware digital twin (AADT), the AADT to simulate operations of a clock manager for a node in a network based on models of the clock manager, the AADT to comprise:

a clock manager model to receive time information for a network and generate model clock control information to adjust a clock to a network time for the network, the model clock control information to contain a malicious time sample introduced by a time desynchronization attack in the network; and a model recovery manager to remove the malicious time sample from the model clock control information using a set of expected offset values to adjust the clock to the network time for the network, the model recovery manager comprising an attack extractor, the attack extractor to:

receive a first expected offset value for the clock based on the model clock control information for a current synchronization cycle;

retrieve a second expected offset value for the clock based on model clock control information stored for a previous synchronization cycle;

determine a difference value between the first expected offset value and the second expected offset value; and calculate an attack amplitude based on the difference value, the attack amplitude to represent an amount of time offset caused by the time desynchronization attack.

9. A method, comprising:

receiving time information for a network by an attack-aware digital twin (AADT), the AADT to simulate operations of a clock manager for a node in the network based on models of the clock manager;

generating model clock control information to adjust a hardware clock to a network time for the network, the model clock control information to contain a malicious time sample introduced by a time desynchronization attack in the network;

generating a measured offset value from the time information using a protocol computations model of a clock manager model for the AADT;

generating model clock control information to adjust a hardware clock to a network time for the network based on the measured time offset value using a clock servo model of the clock manager model for the AADT;

generating an expected offset value for the hardware clock based on the model clock control information using a time synchronization model for the clock manager model of the AADT, the time synchronization model to simulate clock circuitry to manage the clock; and removing the malicious time sample from the model clock control information using the expected offset value to adjust the hardware clock to the network time for the network.

10. The method of claim 9, comprising controlling access to the hardware clock by a clock control gate in response to gate control logic.

11. The method of claim 10, comprising:

determining the network is operating under attack conditions when an alert message is received from an intrusion detection system (IDS); and sending a configuration signal to the clock control gate to configure the clock control gate to pass the model clock control information without the malicious time sample from the AADT to the hardware clock to adjust the hardware clock to the network time for the network.

12. The method of claim 10, comprising:

determining the network is operating under benign conditions; and sending a configuration signal to the clock control gate to configure the clock control gate to pass the clock control information from the clock manager to the hardware clock to adjust the hardware clock to the network time for the network.

13. A method, comprising:

receiving time information for a network by an attack-aware digital twin (AADT), the AADT to simulate operations of a clock manager for a node in the network based on models of the clock manager;

generating model clock control information to adjust a clock to a network time for the network, the model clock control information to contain a malicious time sample introduced by a time desynchronization attack in the network;

receiving a first expected offset value for the clock based on the model clock control information for a current synchronization cycle by an attack extractor for a model recovery model of the AADT;

retrieving a second expected offset value for the clock based on model clock control information stored for a previous synchronization cycle by the attack extractor;

determining a difference value between the first expected offset value and the second expected offset value by the attack extractor;

calculating an attack amplitude based on the difference value by the attack extractor, the attack amplitude to represent an amount of time offset caused by the time desynchronization attack; and removing the malicious time sample from the model clock control information using the attack amplitude to adjust the clock to the network time for the network.

14. A non-transitory computer-readable storage medium, the computer-readable storage medium including instructions that when executed by processing circuitry, cause the processing circuitry to:

receive time information for a network by an attack-aware digital twin (AADT), the AADT to simulate operations of a clock manager for a node in the network based on physics-aware models;

generate model clock control information to adjust a hardware clock to a network time for the network, the model clock control information to contain a malicious time sample introduced by a time desynchronization attack in the network;

generate a measured offset value from the time information using a protocol computations model of a clock manager model for the AADT;

generate model clock control information to adjust the hardware clock to a network time for the network based on the measured time offset value using a clock servo model of the clock manager model for the AADT;

generate an expected offset value for the hardware clock based on the model clock control information using a time synchronization model for the clock manager model of the AADT, the time synchronization model to simulate clock circuitry to manage the hardware clock; and remove the malicious time sample from the model clock control information using the expected offset value to adjust the hardware clock to the network time for the network.

15. The computer-readable storage medium of claim 14, comprising instructions that when executed by the processing circuitry cause the processing circuitry to control access to the hardware clock by a clock control gate in response to gate control logic.

16. The computer-readable storage medium of claim 15, comprising instructions that when executed by the processing circuitry cause the processing circuitry to:

determine the network is operating under attack conditions when an alert message is received from an intrusion detection system (IDS); and send a configuration signal to the clock control gate to configure the clock control gate to pass the model clock control information without the malicious time sample from the AADT to the hardware clock to adjust the hardware clock to the network time for the network.

17. The computer-readable storage medium of claim 14, comprising instructions that when executed by the processing circuitry cause the processing circuitry to:

determine the network is operating under benign conditions; and send a configuration signal to the clock control gate to configure the clock control gate to pass the clock control information from the clock manager to the hardware clock to adjust the hardware clock to the network time for the network.

* * * * *